(12) United States Patent
Chen et al.

(10) Patent No.: US 12,564,835 B2
(45) Date of Patent: Mar. 3, 2026

(54) BIOSENSING PLATFORM FOR IN-SITU SAMPLING AND TARGET DETECTION BASED ON UPCONVERSION LUMINESCENCE

(71) Applicants: JIMEI UNIVERSITY, Xiamen (CN); JIANGSU UNIVERSITY, Zhenjiang (CN)

(72) Inventors: Quansheng Chen, Xiamen (CN); Jizhong Wu, Zhenjiang (CN); Qin Ouyang, Zhenjiang (CN); Wenya Wei, Zhenjiang (CN); Huanhuan Li, Zhenjiang (CN); Jingui Zhang, Zhenjiang (CN); Jinghao Yu, Zhenjiang (CN)

(73) Assignees: JIMEI UNIVERSITY, Xiamen City (CN); JIANGSU UNIVERSITY, Zhenjiang City (CN)

( * ) Notice: Subject to any disclaimer, the term of this patent is extended or adjusted under 35 U.S.C. 154(b) by 244 days.

(21) Appl. No.: 18/499,160

(22) Filed: Oct. 31, 2023

(65) Prior Publication Data

US 2024/0075474 A1 Mar. 7, 2024

Related U.S. Application Data

(63) Continuation of application No. PCT/CN2022/118789, filed on Sep. 14, 2022.

(30) Foreign Application Priority Data

Aug. 31, 2022 (CN) .......................... 202211055330.1

(51) Int. Cl.
*B01L 3/00* (2006.01)
*G01N 21/76* (2006.01)

(52) U.S. Cl.
CPC ........ *B01L 3/502753* (2013.01); *G01N 21/76* (2013.01); *B01L 2200/16* (2013.01); *B01L 2300/0627* (2013.01); *B01L 2300/126* (2013.01)

(58) Field of Classification Search
None
See application file for complete search history.

(56) References Cited

U.S. PATENT DOCUMENTS

| | | | | |
|---|---|---|---|---|
| 10,261,018 B2 * | 4/2019 | Earney | ................. | G01J 3/4406 |
| 10,335,040 B2 * | 7/2019 | Abreu | ................. | A61B 5/6814 |

(Continued)

FOREIGN PATENT DOCUMENTS

| | | |
|---|---|---|
| CN | 102925157 A | 2/2013 |
| CN | 103822904 A | 5/2014 |

(Continued)

OTHER PUBLICATIONS

Qian Liu et al., "Single upconversion nanoparticle imaging at sub-10 W cm-2 irradiance", Nature Photonics, vol. 12, Aug. 6, 2018, pp. 548-553.

(Continued)

*Primary Examiner* — Lore R Jarrett

(57) ABSTRACT

A biosensing platform for in-situ sampling and target detection based on upconversion luminescence, including: an upconversion luminescent paper-based microfluidic device, an upconversion luminescent biosensor, and a portable detection device based on smartphone imaging. The upconversion luminescent paper-based microfluidic device is configured to sample a to-be-detected substance in situ. The upconversion luminescent biosensor is configured to allow a target to specifically recognize the to-be-detected substance. The portable detection device is configured to detect a content of the to-be-detected substance. The upconversion luminescent biosensor is prepared as follows. (S1) An (Continued)

upconversion nanoparticle seed is prepared. (S2) Core-shell upconversion nanoparticles are prepared. (S3) Core-shell-shell upconversion nanoparticles (UCNPs) are prepared. (S4) The UCNPs is subjected to hydrophilic modification. (S5) The hydrophilically-modified UCNPs are modified with DNA. (S6) The DNA-modified particles obtained from step (S5) are modified with a dye. The to-be-detected substance is 17β-estradiol (17β-E2).

5 Claims, 24 Drawing Sheets

Specification includes a Sequence Listing.

(56) References Cited

U.S. PATENT DOCUMENTS

| | | | |
|---|---|---|---|
| 11,365,349 B2 * | 6/2022 | Junkkari | C09K 11/7773 |
| 2005/0112703 A1 | 5/2005 | Song | |
| 2014/0147391 A1 | 5/2014 | Hao et al. | |
| 2015/0252259 A1 * | 9/2015 | Jin | C09K 11/025 |
| | | | 250/459.1 |
| 2018/0217062 A1 * | 8/2018 | Kim | G01N 21/6428 |
| 2021/0396746 A1 | 12/2021 | Jin et al. | |
| 2025/0180552 A1 * | 6/2025 | Jin | G01N 33/54388 |

FOREIGN PATENT DOCUMENTS

| | | | |
|---|---|---|---|
| CN | 104707138 A | 6/2015 |
| CN | 105806816 A | 7/2016 |
| CN | 105903016 A | 8/2016 |
| CN | 108801988 A | 11/2018 |
| CN | 110947433 A | 4/2020 |
| CN | 111250177 A | 6/2020 |
| CN | 111307766 A | 6/2020 |
| CN | 111856012 A | 10/2020 |
| CN | 113056674 A | 6/2021 |
| CN | 113588618 A | 11/2021 |
| CN | 113640265 A | 11/2021 |
| CN | 113817469 A | 12/2021 |
| CN | 215727702 U | 2/2022 |

OTHER PUBLICATIONS

Jizhong Wu et al., "Ratiometric upconversion-luminescence in-situ sampling aptasensing platform integrated with smartphone-based device for visual detection of 17β-estradiol", Sensors and Actuators: B. Chemical, vol. 390, May 26, 2023, pp. 1-10.

Shuwei Hao et al., "Sensing Using Rare-Earth-Doped Upconversion Nanoparticles", Theranostics, vol. 3, No. 5, Mar. 26, 2013, pp. 331-345.

* cited by examiner

BIOSENSING PLATFORM FOR IN-SITU SAMPLING AND TARGET DETECTION BASED ON UPCONVERSION LUMINESCENCE

CROSS-REFERENCE TO RELATED APPLICATIONS

This application is a continuation of International Patent Application No. PCT/CN2022/118789, filed on Sep. 14, 2022, which claims the benefit of priority from Chinese Patent Application No. 202211055330.1, filed on Aug. 31, 2022. The content of the aforementioned application, including any intervening amendments thereto, is incorporated herein by reference in its entirety.

REFERENCE TO AN ELECTRONIC SEQUENCE LISTING

The contents of the electronic sequence listing (Sequence-Listing.xml; Size: 3,319 bytes; and Date of Creation: Oct. 27, 2023) is herein incorporated by reference in its entirety.

TECHNICAL FIELD

The present disclosure relates to food safety detection, and more particularly to a biosensing platform for in-situ sampling and target detection based on upconversion luminescence.

BACKGROUND

Rapid preliminary screening of health markers and food safety hazard factors is important for safeguarding human health. Around the world, especially in less developed countries and regions, a large number of patients miss the best timing for treatment because of the lack of timely diagnosis. Moreover, there are a large number of food safety cases related to the accidental consumption of food contaminated with hazardous ingredients.

17β-estradiol (17β-E2) is a natural steroidal estrogen with strong biological activity, and an appropriate level of 17β-E2 is essential for egg maturation, embryonic development, regulation of the female reproductive system, and bone growth and development. However, 17β-E2 added to the feed to promote animal growth will cause serious environmental contamination, and may be readily enriched in the human body through the biological chain. Excessive estrogen stimulation may have adverse effects on the nervous, reproductive and immune systems of animals and humans. Therefore, the specific identification and rapid on-site analysis of 17β-estradiol (17β-E2) as a model target are of great significance for medical diagnosis, environmental monitoring and food safety control.

At present, conventional 17β-E2 detection methods, such as high-performance liquid chromatography (HPLC), enzyme-linked immunosorbent assay (ELISA), etc., often struggle with expensive testing equipment, high testing costs, and complicated testing steps, and thus fail to realize the rapid on-site quantitative detection of 17β-E2.

SUMMARY

In view of the shortcomings of the prior art, the present disclosure provides a biosensing platform for in-situ sampling and target detection based on upconversion luminescence, which can realize the in-situ sampling and on-site quantitative detection of 17β-estradiol.

Based on this, a first object of the present disclosure is to provide a biosensing platform for in-situ sampling and target detection based on upconversion luminescence, comprising:

an upconversion luminescent paper-based microfluidic device;

an upconversion luminescent biosensor; and a portable detection device based on smartphone imaging;

wherein the upconversion luminescent paper-based microfluidic device is configured for in-situ sampling of a to-be-detected substance; the upconversion luminescent biosensor is configured to allow a target to specifically recognize the to-be-detected substance; the portable detection device based on smartphone imaging is configured to detect a content of the to-be-detected substance;

the upconversion luminescent biosensor is prepared through steps of:

(S1) preparing an upconversion nanoparticle seed;

(S2) preparing a core-shell upconversion nanoparticles;

(S3) preparing a core-shell-shell upconversion nanoparticles (UCNPs);

(S4) carrying out hydrophilic modification on the UCNPs;

(S5) modifying the hydrophilically-modified UCNPs obtained in step (S4) with DNA; and (S6) modifying DNA-modified UCNPs obtained from step (S5) with a dye.

In an embodiment, the to-be-detected substance is 17β-estradiol (17β-E2).

In an embodiment, the step (S1) comprises:

mixing a methanol solution containing yttrium chloride hexahydrate, oleic acid, 1-octadecene fully followed by reaction at 160-170° C. for 25-35 min and cooling to obtain a first reaction mixture;

adding a methanol solution containing sodium oleate and ammonium fluoride to the first reaction mixture followed by reaction at 120-130° C. for 25-35 min and at 290-300° C. for 25-35 min to obtain a second reaction mixture; and adding ethanol to the second reaction mixture to obtain a solid precipitate followed by centrifugal washing to obtain the upconversion nanoparticle seed.

In an embodiment, the amount of the yttrium chloride hexahydrate is 1-1.2 mmol.

In an embodiment, the volume ratio of the methanol, oleic acid, and 1-octadecene is 2:(1-1.3):(1-1.2).

In an embodiment, the amount of methanol solution added twice is 1:1.

In an embodiment, the mass ratio of sodium oleate to ammonium fluoride is (5-6):1.

In an embodiment, the washing step is that the solid precipitate is centrifuged and washed three times with a mixed solution of cyclohexane and ethanol.

In an embodiment, the volume ratio of cyclohexane to ethanol is 1:1.

In an embodiment, the centrifugation parameter is 10-15 min at 10000-12000 rpm.

In an embodiment, the step (S2) comprises:

mixing a methanol solution containing ytterbium chloride hexahydrate and thulium chloride hexahydrate, oleic acid, 1-octadecene fully followed by reaction at 160-170° C. for 25-35 min and cooling to obtain a first reaction mixture;

adding a cyclohexane solution containing the upconversion nanoparticle seed obtained in step (S1) and a methanol solution containing sodium hydroxide and ammonium fluoride to the first reaction mixture followed by reaction at 120-130° C. for 25-35 min and at 290-300° C. for 60-70 min to obtain a second reaction mixture; and adding ethanol to the second reaction mixture to obtain a solid precipitate followed by centrifugal washing to obtain the core-shell upconversion nanoparticles.

In an embodiment, the amount of the ytterbium chloride hexahydrate is 0.35-0.4 mmol and the amount of the thulium chloride hexahydrate is 0.01-0.03 mmol.

In an embodiment, the volume ratio of the methanol, oleic acid, and 1-octadecane dilution is 10:(2-3):(6-8).

In an embodiment, the amount of methanol solution added twice is 1:1.

In an embodiment, the ratio of the sodium hydroxide to ammonium fluoride in substance is 1:1-1.5.

In an embodiment, the washing step is that the solid precipitate is centrifuged and washed three times with a mixed solution of cyclohexane and ethanol.

In an embodiment, the volume ratio of cyclohexane to ethanol is 1:1.

In an embodiment, the centrifugation parameter is 10-15 min at 10000-12000 rpm.

In an embodiment, the step (S3) comprises:

mixing a methanol solution containing yttrium chloride hexahydrate, oleic acid, 1-octadecene fully followed by reaction at 160-170° C. for 25-35 min and cooling to obtain a first reaction mixture;

adding a cyclohexane solution containing the core-shell upconversion nanoparticles obtained in step (S2) and a methanol solution containing sodium hydroxide and ammonium fluoride to the first reaction mixture followed by reaction at 120-130° C. for 25-35 min and at 290-300° C. for 60-70 min to obtain a second reaction mixture; and adding ethanol to the second reaction mixture to obtain a solid precipitate followed by centrifugal washing to obtain the UCNPs.

In an embodiment, the amount of said yttrium chloride hexahydrate is 0.2-0.5 mmol.

In an embodiment, the volume ratio of the methanol, oleic acid, and 1-octadecadecane is 15:(2-3):(6-8).

In an embodiment, the amount of methanol solution added twice is 2:1.

In an embodiment, the ratio of the sodium hydroxide to ammonium fluoride in substance is 1:1-1.5.

In an embodiment, the washing step is that the solid precipitate is centrifuged and washed three times with a mixed solution of cyclohexane and ethanol.

In an embodiment, the volume ratio of cyclohexane to ethanol is 1:1.

In an embodiment, the centrifugation parameter is 10-15 min at 10000-12000 rpm.

In an embodiment, the drying temperature is 60-65° C.

In an embodiment, the step (S4) comprises:

dispersing the UCNPs obtained in step (S3) in a hydrochloric acid solution followed by ultrasonic treatment for 30-40 min, and centrifugation, washing and transferring to a mixture of chloroform and toluene to obtain a first reaction mixture;

adding an aqueous solution containing polyacrylic acid to the first reaction mixture to obtain a second reaction mixture; and sealing the second reaction mixture followed by reaction under vigorous stirring for 24-48 h, centrifugation and washing to obtain carboxyl-grafted UCNPs.

In an embodiment, the amount of the UCNPs is 50-80 mg.

In an embodiment, the dosage of the hydrochloric acid is 3-5 mL.

In an embodiment, the centrifugation during the reaction is performed at 10000-12000 rpm for 10-15 min.

In an embodiment, the amount of the polyacrylic acid is 400-600 mg.

In an embodiment, the volume ratio of the aqueous solution of chloroform, methane, polyacrylic acid is 4:(6-8):(13-15).

In an embodiment, the washing method is, by alternating between ethanol and ultrapure water, or by using only ultrapure water.

In an embodiment, the step (S5) comprises:

dispersing the carboxyl-grafted UCNPs obtained in step (S4) in a 4-morpholineethanesulfonic acid buffer containing carbamide and N-hydroxysulfosuccinimide followed by incubation for 2-3 h and centrifugation to obtain activated carboxyl-grafted UCNPs; and grafting a strand complementary to an aptamer strand and the aptamer strand sequentially onto the activated carboxyl-grafted UCNPs to obtain the DNA-modified UCNPs.

In an embodiment, the mass ratio of the carboxyl-grafted UCNPs, carbamide, and N-hydroxysulfosuccinimide is 1:2:1.

In an embodiment, the amount of the 4-morpholineethanesulfonic acid buffer is 10-15 mL.

In an embodiment, the aptamer complementary chain modification process is that 200 μL of 10 μM of 17β-E2 aptamer complementary chain is added to a solution of activated carboxyl-grafted UCNPs, and after incubation at 35-37° C. for 10-12 h on a shaking bed, centrifugation is performed to separate and wash twice with phosphate buffer to obtain the surface-modified aptamer chain UCNPs.

In an embodiment, the aptamer chain modification process is that 200 μL of 10 μM of 17β-E2 aptamer chain is added to the surface modified aptamer chain UCNPs solution, kept at 95-100° C. for 3-5 min, then slowly annealed to 65° C. and incubated at 35-37° C. in a shaking bed for 1-1.2 h, centrifuged and washed twice with phosphate buffer to obtain DNA-modified UCNPs.

In an embodiment, the step (S6) comprises adding SYBR Green I dye at a concentration of 9 mL 10× to 50 ml of DNA-modified UCNPs obtained in step (S5) followed by incubation at 37° C. in a shaker for 30-40 min to obtain an upconversion luminescent biosensor for target-specific recognition.

In an embodiment, the upconversion luminescent paper-based microfluidic device comprises:

a probe;

a paper-based substrate; and a detection region;

wherein the probe has a cone shape; the paper-based substrate is affixed to an outer surface of the probe and is located on an end close to a vertex of the probe; the paper-based substrate is configured for sampling and chromatography of a sample containing the to-be-detected substance; the detection region is affixed to the outer surface of the probe, and is located on an end away from the vertex of the probe; the detection region is configured for combining the to-be-detected substance with the upconversion luminescent biosensor; and the paper-based substrate is connected to the detection region.

In an embodiment, the paper-based substrate needs to be hydroxyl modified.

In an embodiment, the step of hydroxyl modifying the paper-based substrate is as follows: soak the paper-based substrate in 5 mol/L hydrogen peroxide for 10-15 min, drain until nearly dry to obtain the hydroxyl modified paper-based substrate.

In an embodiment, the paper-based substrate is made of Whatman 5 #filter paper.

In an embodiment, the hydroxyl modified paper-based substrate needs to be cut.

In an embodiment, the hydroxyl modified paper-based substrate is cut in a fan shape.

In an embodiment, the fan shape has a rounded angle of 18° and a radius of 80 mm.

In an embodiment, starting from the center of the circle of the sector, a sacrificial valve is drawn with a dye at ⅓ of the radius of the sector, the area between the sacrificial valve and the center of the circle is the sampling area, and the area between the sacrificial valve and the arc of the sector is the chromatography area.

In an embodiment, the dye is pararosaniline hydrochloride.

In an embodiment, three independent chromatographic channels are constructed by drawing a paraffin barrier using liquid paraffin at three equal positions in the chromatographic region; three independent detection regions are obtained by punching holes at the ends of the three chromatographic channels using a hole punch.

In an embodiment, the detection regions need to be amino modified.

In an embodiment, the step of amino modification of the detection region is as follows: the detection region is static placed in 5% ethanol solution of aminopropyltriethoxysilane, heated at 70° C. for 2-3 h, and after the reaction is finished, it is left to drain, and the amino modified detection region is obtained.

In an embodiment, the amino-modified detection region needs to be combined with an upconversion luminescent biosensor.

In an embodiment, the combining step is: using the negative pressure method to draw the filtration one by one, and the upconversion luminescent biosensor is combined to the surface of the filter paper of the detection region.

In an embodiment, the concentration of the upconversion luminescent biosensor is 0.05 mg/mL.

In an embodiment, the number of times of negative pressure filtration is 5 times.

In an embodiment, the probe is a polymethylmethacrylate probe having a large end diameter to slant height ratio of 1:10.

In an embodiment, the portable detection device comprises a box; an inside of the box is provided with a moving mechanism; a near-infrared laser is arranged opposite to the moving mechanism;

a side wall of the box is fixedly provided with a helical rack perpendicular to a bottom surface of the box; the helical rack comprises a helical tooth portion and a clamping portion integrally arranged with the helical tooth portion; the clamping portion has a trapezoidal cross section; an upper base of the trapezoidal cross section faces towards the side wall of the box; a bottom base of the trapezoidal cross section faces towards the helical tooth portion; a length of the bottom base of the trapezoidal cross section is greater than a length of a segment where the helical tooth portion coincides with the clamping portion;

the moving mechanism comprises:
a first fixed frame;
a helical gear; and
a rotating shaft;
the first fixed frame is sleeved on the helical rack; the helical gear is engaged with the helical rack; the rotating shaft is fixedly provided with the helical gear and passes through two side walls of the first fixed frame and a center hole of the helical gear; both ends of the rotating shaft are each fixedly provided with a knob; the knob is configured to be rotated to realize upward and downward movement of the first fixed frame;

the laser platform is fixedly provided on a side of the first fixed frame towards the near-infrared laser; a sleeve is integrally provided on a side of the laser platform towards the near-infrared laser, and is configured for fixing a detector of the near-infrared laser; the detector is configured to emit a laser light to irradiate on the detection region on the detection region support platform;

the moving mechanism also comprises a second fixed frame with the same structure as the first fixed frame; the second fixed frame is arranged below the first fixed frame; the second fixed frame is configured to moved up and down along the helical rack; the detection region support platform is fixedly provided on a side of the second fixed frame towards the near-infrared laser, and is configured for placement of the detection region loaded with the upconversion luminescent biosensor;

a top of the box is provided with a through hole above the detection region; a near-infrared filter is provided at the through hole;

the portable detection device comprises a smartphone; and a camera of the smartphone is configured to perform imaging on the detection region placed on the detection region support platform through the near-infrared filter; and the smartphone is equipped with a target concentration prediction software, the target concentration prediction software is configured to be executed to call a camera function of the smartphone to acquire images of the detection region, and to realize functions of cutting an area of interest from a fluorescence image, extracting an image characteristic value of an image feature and calculating a target concentration.

In an embodiment, the portable detection device also comprises a box door.

In an embodiment, the box door is fitted with iron sheets at the corners, and the closure of the box and the box door is realized by four magnets.

A second object of this disclosure is to provide a detection method using the biosensing platform for in-situ sampling and target detection based on upconversion luminescence, comprising:

preparing a plurality of 17β-E2 standard solutions varying in concentration, wherein concentrations of the plurality of 17β-E2 standard solutions are selected from 0-500 ng/mL;

sampling each of the plurality of 17β-E2 standard solutions with the upconversion luminescent paper-based microfluidic device to allow binding of 17β-E2 to the upconversion luminescent biosensor;

collecting a fluorescence spectrum of the detection region by using a fluorescence spectrometer; and subjecting logarithmic values of the concentrations of the plurality of 17β-E2 standard solutions and fluorescence signal characteristic values to linear fitting to establish a fluorescence standard curve of 17β-E2; wherein fluorescence signal characteristic values are calculated by a ratio of a fluorescence intensity at 477 nm ($I_{477}$) to a fluorescence intensity at 646 nm ($I_{646}$);

subjecting logarithmic values of the concentrations of the plurality of 17β-E2 standard solutions and image signal characteristic values obtained by a smartphone software to linear fitting to establish an image standard curve of 17β-E2 by using the portable detection device;

performing in-situ sampling on a sample containing the to-be-detected substance by using the upconversion luminescent paper-based microfluidic device to allow binding of the to-be-detected substance to the upconversion luminescent biosensor; and determining a fluorescence signal characteristic value and an image signal characteristic value respectively; substituting the fluorescence signal characteristic value and the image signal characteristic value respectively into the fluorescence standard curve and the image standard curve to calculate a content of the to-be-detected substance in the sample.

Compared to the prior art, the present disclosure has the following beneficial effects.

1. This application discloses a biosensing platform integrated target in-situ sampling and detection. The platform is based on an upconversion luminescent paper-based microfluidic device to realize controlled in-situ sampling of targets in a sample, and to realize pre-treatment of the detection fluid and separation of the target by chromatography. The upconversion luminescent biosensor is based on the load of detection region of the upconversion luminescent paper-based microfluidic device, which recognizes the target and induces a change of the fluorescence signal of the upconversion nanoparticles to realize the quantitative detection of the concentration of the target substance. It is of great significance for the preliminary diagnosis of diseases and the in-situ detection of food safety.

2. The present application constructs a specific detection system, specifically a fluorescence resonance energy transfer system based on the composition of UCNPs and SYBR Green I, constructed by optimized design of aptamers and their complementary chain. This application has sensitive fluorescence responsiveness to the target which can effectively eliminate the interference of background fluorescence of complex matrix. By connecting different target molecule aptamers and their corresponding complementary sequences, the present application can realize specific recognition and detection methods for different target molecules, and has good general applicability.

3. The portable smartphone-based detection device designed and prepared by the present invention has ultra-low manufacturing costs. The portable device is easy to operate, and with the designed cell phone software, it has powerful user-friendly features, the waiting time for the whole process of detection is short, and can get the results directly on-site through the smartphone.

4. The upconversion luminescent paper-based microfluidic device constructed by this application has high sensitivity, high specificity and strong anti-interference for target detection. The signal read out based on fluorescence spectrometer has a detection range of 0.02-200 ng/ml and a detection limit of 0.012 ng/mL. The signal readout of the portable detection device based on smartphone imaging has a detection range of 0.05-200 ng/ml and a detection limit of 0.042 ng/mL. And there is little difference in detection value between the fluorescence spectrometer and the portable detection device. At the same time, the detection accuracy fully meets the initial rapid screening detection of human health and food safety, and has a good practical prospect.

5. This application synthesizes a core-shell-shell UCNPs. The core and shell are inert materials, and do not have the function of energy transfer and upconversion luminescence. The shell thickness is only 4 nm. If the outer shell is too thick, the ions in the inner core will not be able to meet the distance requirements of the fluorescence resonance energy transfer system, resulting in a significant reduction in the overall fluorescence resonance energy transfer efficiency, which will lead to insensitive detection in practical use for analysis and detection. The rare earth materials (ytterbium ions, thulium ions) that realize the energy multilevel transfer and up-convention luminescence are confined in the inner-shell structure (the middle layer). Therefore, it is possible to effectively meet the design of this application, which not only meets the need of the fluorescence resonance energy transfer system for the distance (<10 nm), but also overcomes the surface defects and cross-chattering of the UCNPs material, and significantly improves the fluorescence intensity and fluorescence resonance energy transfer efficiency.

DESCRIPTION OF THE DRAWINGS

In order to illustrate the technical solutions of the embodiments of this application or in the prior art more clearly, the drawings required in the embodiments will be briefly described below. Obviously, presented in the drawings are only some embodiments of this application, and other drawings may be obtained by those of ordinary skill in the art based on these drawings without making creative effort.

Figure 1A:
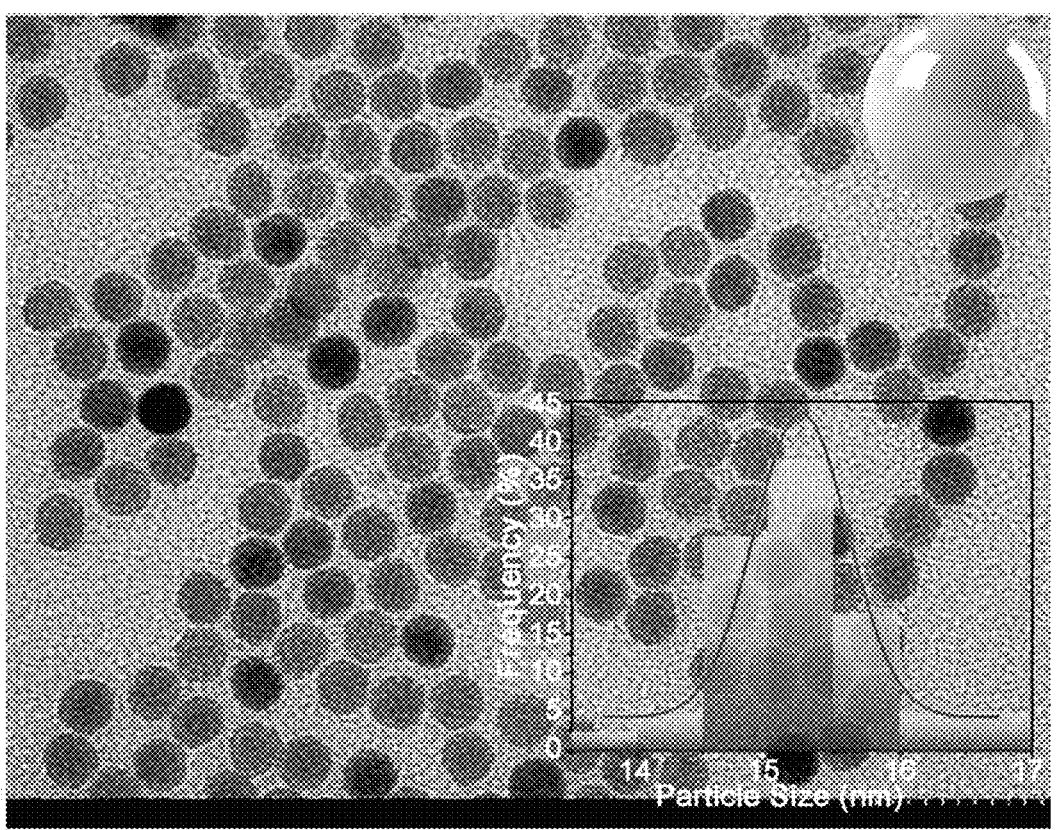
FIGS. 1A-F show characterization of upconversion nanoparticles prepared in Example 1 of the present disclosure; where A is a transmission electron microscopy (TEM) image of the upconversion nanoparticle seed; B is a TEM image of the core/shell upconversion nanoparticles; C is a TEM image of core/shell/shell upconversion nanoparticles; D is an X-ray diffraction (XRD) pattern of upconversion nanoparticles; E is a mid-infrared absorption spectrum of the surface-modified UCNPs; and F shows the potential change during modification of the upconversion nanoparticles.

In the drawings, 1. paper-based substrate; 11. sampling area; 12. sacrificial valve; 13. paraffin barrier; 14. chromatography region; 2. detection region; 3. probe; 4. smartphone; 5. box; 51. near-infrared filter; 52. through hole; 53. helical rack; 531. helical tooth portion; 532. clamping portion; 6. moving mechanism; 61. first fixed frame; 62. helical gear; 63. rotating shaft; 64. knob; 65. second fixed frame; 7. laser platform; 71. sleeve; 8. detection region support platform; 9. near-infrared laser; and 91. detector.

DETAILED DESCRIPTION OF EMBODIMENTS

The technical solutions of the present disclosure will be clearly and completely described below with reference to the embodiments of the present disclosure. Obviously, described below are only some embodiments, rather than all embodiments, of the present disclosure. All other embodiments obtained by those skilled in the art based on the embodiments provided herein without making any creative effort shall fall within the protection scope of the present disclosure.

The experimental methods in the following examples are conventional methods unless otherwise specified. The test materials and reagents used in the following examples are commercially available unless otherwise specified. The quantitative tests in the following examples are all performed in triplicate, and the data are expressed as the mean or mean±standard deviation of the three replicates.

In addition, as used herein, "and/or" includes three solutions, for example, "A and/or B" includes A, B, and a combination thereof. In addition, the technical solutions of the embodiments may be combined with each other as long as the combined technical solution can be implemented by those skilled in the art. When the combination is contradictory or cannot be implemented, it should be considered that such combination of the technical solutions does not exist, and does not fall within the scope of the present disclosure defined by the appended claims.

Example 1

An upconversion luminescence biosensor was prepared as follows, and in this example, upconversion nanoparticles were synthesized under the protection of nitrogen.

(S1) 1 mmol of yttrium chloride hexahydrate was dispersed in 10 mL of methanol, to which 10 mL of oleic acid and 10 mL of 1-octadecene were added. The reaction mixture was mixed, heated to 160° C. and reacted at 160° C. for 30 min. After cooled, the reaction mixture was dropwise added with 10 mL of a methanol solution containing 2.03 g of sodium oleate and 0.34 g of ammonium fluoride, reacted at 120° C. for 30 min, and kept at 300° C. for 30 min. Then the reaction mixture was added with 25 mL of ethanol, and centrifuged at 10,000 rpm for 10 min to obtain a solid precipitate. The solid precipitate was washed three times with a mixture of cyclohexane and ethanol in a volume ratio of 1:1 to obtain the upconversion nanoparticle seeds, whose TEM image was shown in FIG. 1A. The upconversion nanoparticle seeds were dispersed in 20 mL of cyclohexane.

Figure 1B:
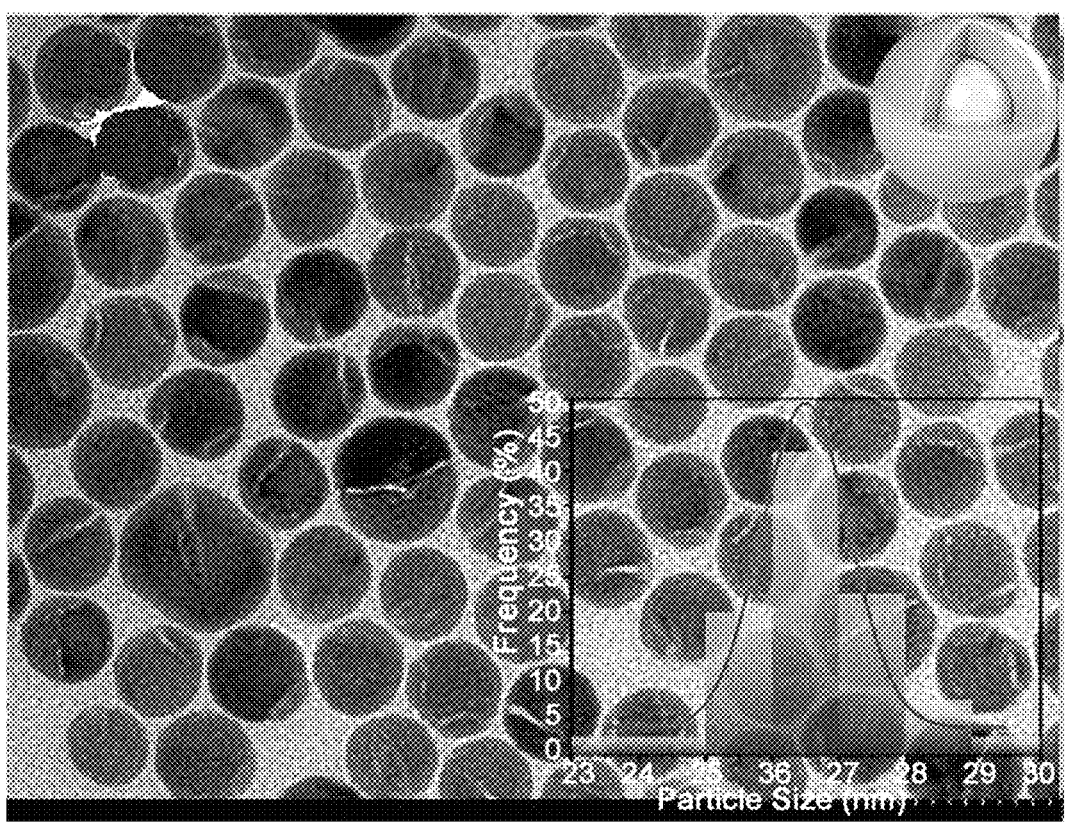
Figure 1C:
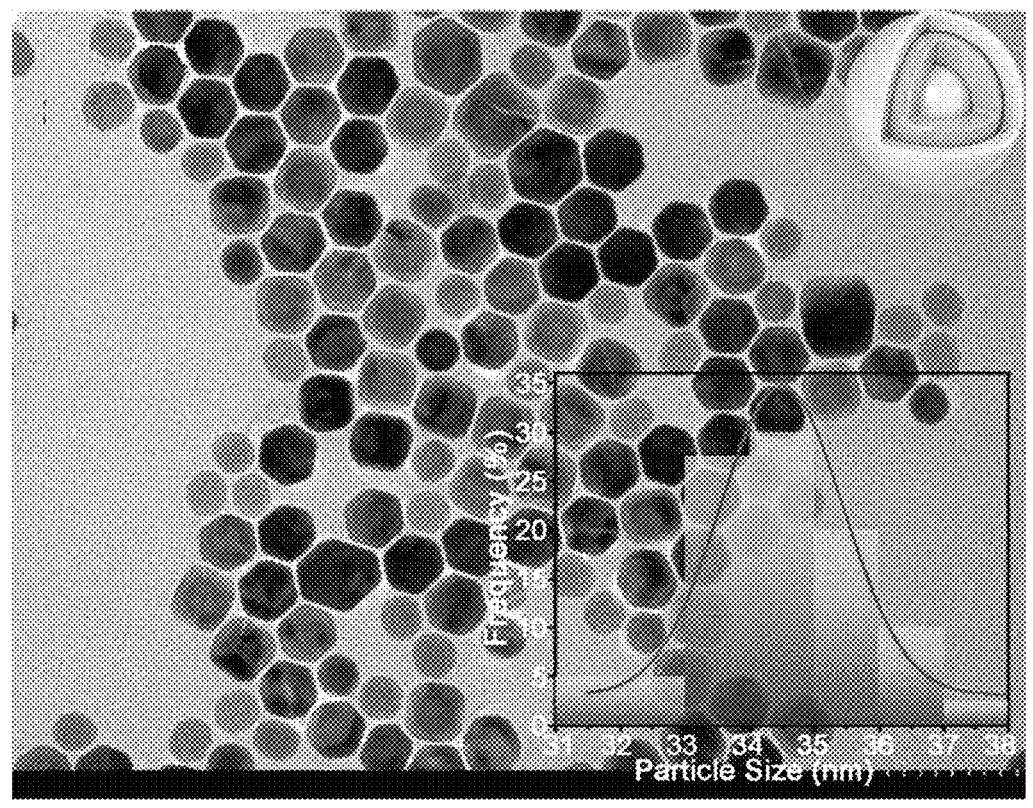
Figure 1D:
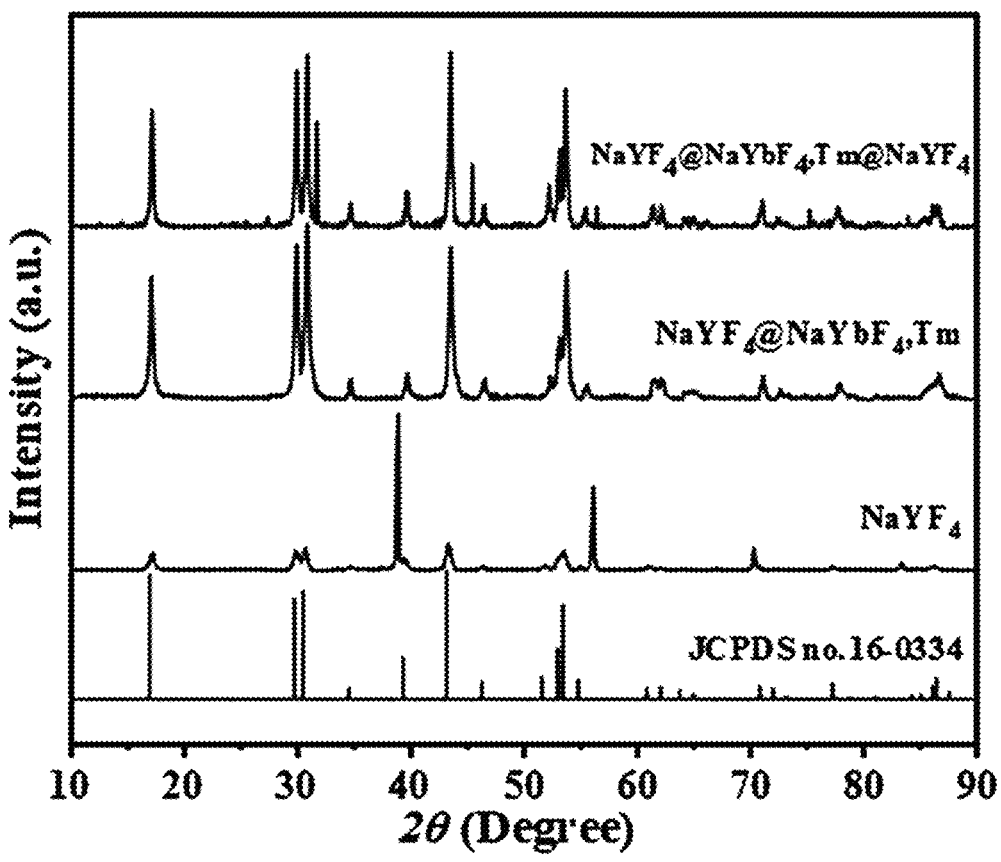

(S2) 0.39 mmol of ytterbium chloride hexahydrate and 0.01 mmol of thulium chloride hexahydrate were dispersed in 10 mL of methanol, to which 6 mL of oleic acid and 16 mL of 1-octadecene were added. The reaction mixture was mixed, heated to 160° C. and reacted at 160° C. for 30 min. After cooled, the reaction mixture was dropwise added with 2 ml of cyclohexane solution containing the upconversion nanoparticle seeds obtained in (S1) and 10 mL of a methanol solution containing 1 mmol of sodium hydroxide and 1.5 mmol of ammonium fluoride, reacted at 120° C. for 30 min, and kept at 300° C. for 60 min. Then the reaction mixture was added with 25 mL of ethanol, and centrifuged at 10,000 rpm for 10 min to obtain a solid precipitate. The solid precipitate was washed three times with a mixture of cyclohexane and ethanol in a volume ratio of 1:1 to obtain the core-shell upconversion nanoparticles, whose TEM image was shown in FIG. 1B. The core-shell upconversion nanoparticles were dispersed in 8 mL of cyclohexane (S3) 0.4 mmol of yttrium chloride hexahydrate was dispersed in 10 mL of methanol, to which 3 mL of oleic acid and 8 mL of 1-octadecene were added. The reaction mixture was mixed, heated to 160° C. and reacted at 160° C. for 30 min. After cooled, the reaction mixture was dropwise added with 4 mL of cyclohexane solution containing the core-shell upconversion nanoparticles obtained in (S2) and 5 mL of a methanol solution containing 1 mmol of sodium hydroxide and 1.5 mmol of ammonium fluoride, reacted at 120° C. for 30 min, and kept at 300° C. for 60 min. Then the reaction mixture was added with 25 mL of ethanol, and centrifuged at 10,000 rpm for 10 min to obtain a solid precipitate. The solid precipitate was washed three times with a mixture of cyclohexane and ethanol in a volume ratio of 1:1 to obtain the UCNPs, whose TEM image was shown in FIG. 1C. The UCNPs were dispersed in 20 mL of cyclohexane Among them, FIG. 1D is the XRD pattern of the three kinds of nanoparticles obtained in steps (S1), (S2), and (S3), and results are in good agreement with a standard card of hexagonal nanomaterials.

(S4) 50 mg of UCNPs were dispersed in 5 mL of a hydrochloric acid solution, ultrasonic treatment for 30 min, centrifuged for 10 min at 12,000 rpm and washed three times with ultrapure water to obtain hydrochloric acid-treated UCNPs, noted as Bare-UCNPs. The hydrochloric acid-treated UCNPs were added to a mixed solution of 4 mL of trichloromethane and 6 mL of methylbenzene, and then 15 mL of aqueous solution containing 400 mg of polyacrylic acid was added followed by sealing and vigorous stirring for 24 h. After that, the carboxyl-grafted UCNPs were obtained by centrifuging the UCNPs at 12,000 rpm for 10 min and washed three times alternately with ethanol and ultrapure water, and were denoted as PAA-UCNPs.

Figure 1E:
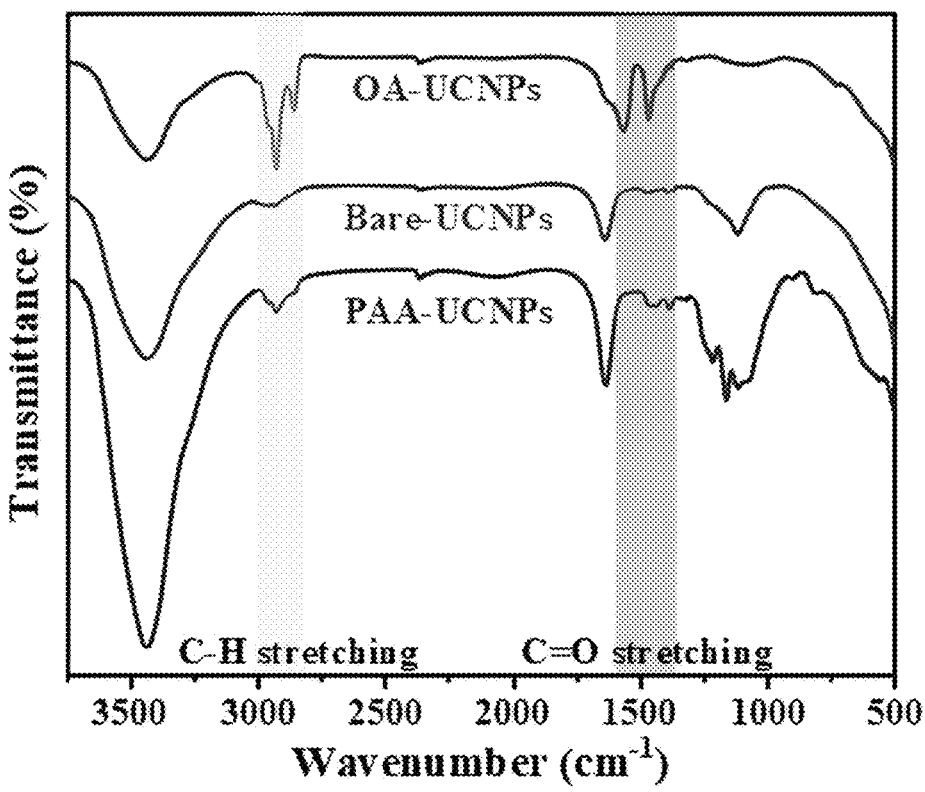

OA-UCNPs are noted as untreated UCNPs, and FIG. 1E shows mid-infrared absorption spectrum of UCNPs during the modification process, indicating the changes in the surface groups of UCNPs and the successful modification of the carboxyl groups.

(S5) 10 mg of PAA-UCNPs were weighed and dispersed in 10 mL of a 4-morpholineethanesulfonic acid buffer solution containing 20 mg of carbamide and 10 mg of N-hydroxysulfosuccinimide, and were incubated for 2 h on a shaking bed followed by centrifugation to obtain the activated carboxyl-grafted UCNPs.

200 μL of 10 μM of 17β-E2 aptamer complementary chain was added to the solution of activated carboxyl-grafted UCNPs, i.e., pH 7.4, 0.1 mol/L PBS buffer, and then was carried out incubation at 37° C. for 10 h in a shaker, centrifugation and washing twice with phosphate buffer to obtain a surface-modified aptamer chain UCNPs, where the sequence of the aptamer complementary chain was 5'-NH$_2$—(CH$_2$)$_6$-G CTT CCG CGC TTC AGC GCG CAG CAA-3' (SEQ ID NO:1).

200 μL of 10 μM of 17β-E2 aptamer chain was added to the surface modified aptamer chain UCNPs solution, i.e., pH 7.4, 0.1 mol/L PBS buffer, and was kept at 95° C. for 3 min, then slowly annealed to 65° C. and was carried out incubation at 37° C. for 1 h in a shaker, centrifugation and washing twice with a phosphate buffer to obtain a DNA-modified UCNPs, i.e., UCNPs-DNA, where the aptamer sequence was 5'-GCT TCC AGC TTA TTG AAT TAC ACG CAG AGG GTA GCG GCT CTG CGC ATT CAA TTG CTG CGC GCT GAA GCG CGG AAG C-3' (SEQ ID NO:2).

Figure 1F:
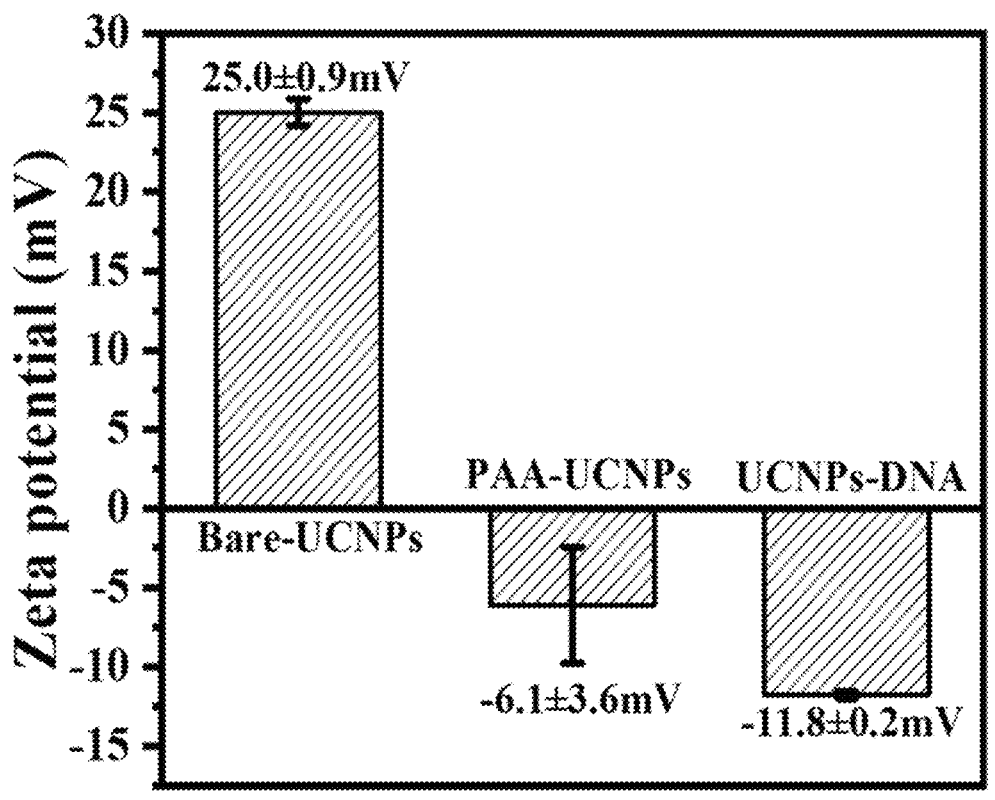

FIG. 1F shows the potential changes during the modification of UCNPs, which shows a gradual decrease of the potential on the surface of UCNPs, indicating the successful modification of the carboxyl group and DNA.

(S6) SYBR Green I dye at a concentration of 9 mL 10× was added to 50 mL of UCNPs solution, i.e., pH 7.4, 0.1 mol/L PBS buffer) containing the DNA-modified UCNPs obtained in step (S5), then was carried out incubation at 37° C. for 30 min in a shaker to obtain upconversion luminescent biosensors for target-specific recognition.

The upconversion luminescent paper-based microfluidic device is prepared through the following steps.

Whatman 5 #filter paper paper-based substrates were soaked in 5 mol/L hydrogen peroxide for 10 min, and drained to near-dryness to obtain paper-based substrates surface-modified with a large number of hydroxyl groups.

Figure 2:
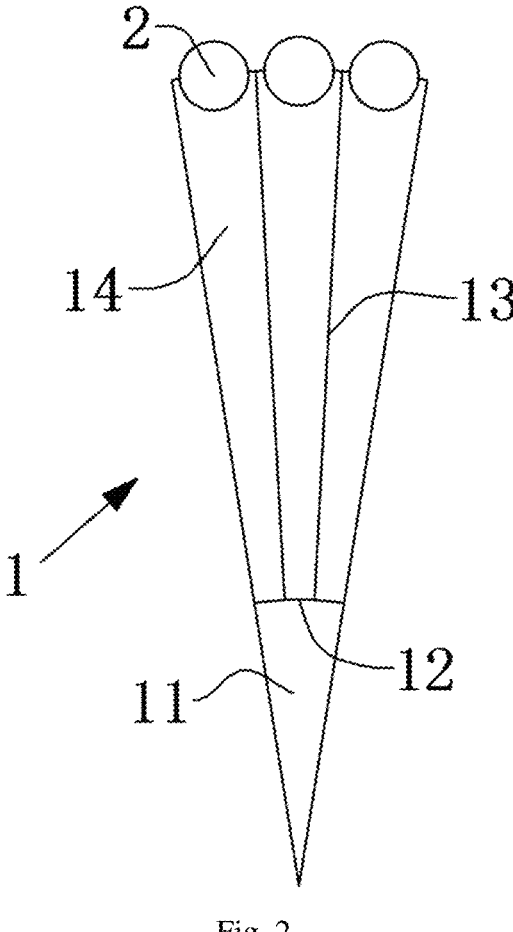
FIG. 2 schematically shows the structure of the paper-based substrate in Example 1 of the present disclosure.
Figure 3:
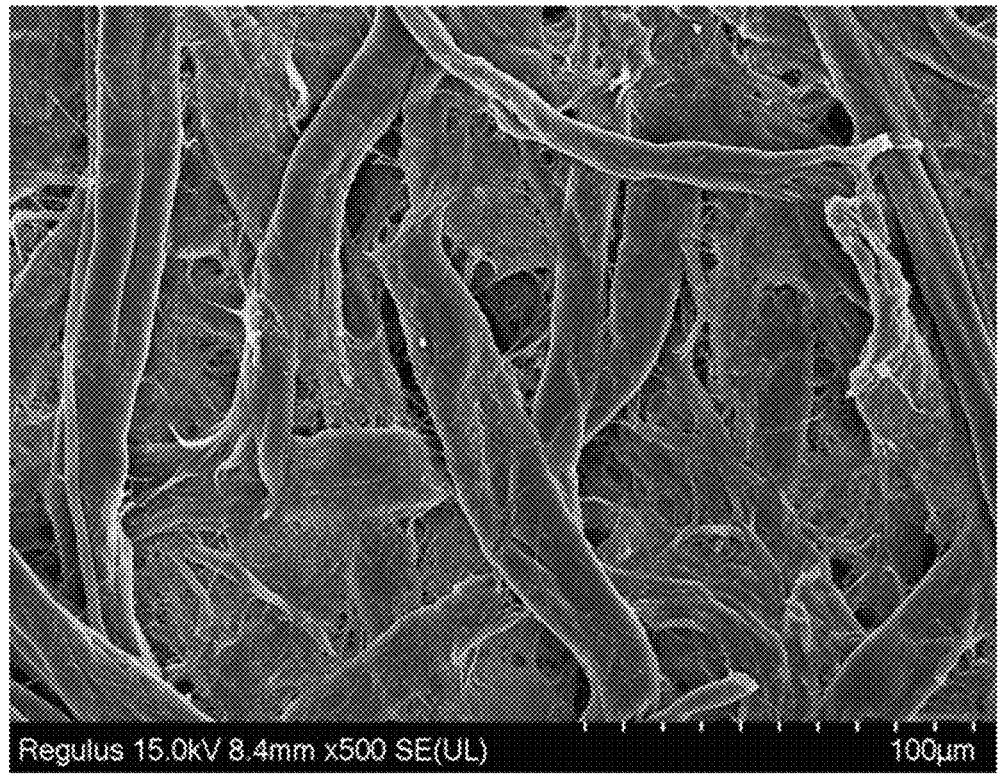
FIG. 3 is a scanning electron microscope (SEM) image of the unmodified original paper-based substrate in Example 1 of the present disclosure.

As shown in FIG. 2, the hydroxyl-modified paper-based substrate 1 was cut into a sector with an angle of 18° and a radius of 8 cm.

A sacrificial valve 12 were drawn at a radius of 3 cm of the sector with pararosaniline hydrochloride dye. A sampling area 11 is between the sacrificial valve 12 and a center of the circle. A chromatography region 14 is between the sacrificial valve 12 and the arc of the sector.

A paraffin barrier 13 was drawn using liquid paraffin in three equal parts of the chromatographic region 14 to construct three separate chromatographic channels. Holes were punched at the ends of the three chromatographic channels using a hole punch to obtain three separate detection regions 2. The detection region 2 was a complete circle. The excess at the end of the sector was cut off based on the arc formed by the center of the circle of the three detection regions 2.

The detection region 2 was static placed in an ethanol solution containing 5% (3-Aminopropyl)triethoxysilane and heated at 70° C. for 3 h. After the reaction, the detection region 2 was statically drained to obtain an amino-modified detection region 2.

0.05 mg/mL of upconversion luminescent biosensor prepared above was bound to the surface of the detection region 2 by five vacuum filtrations.

Figure 12:
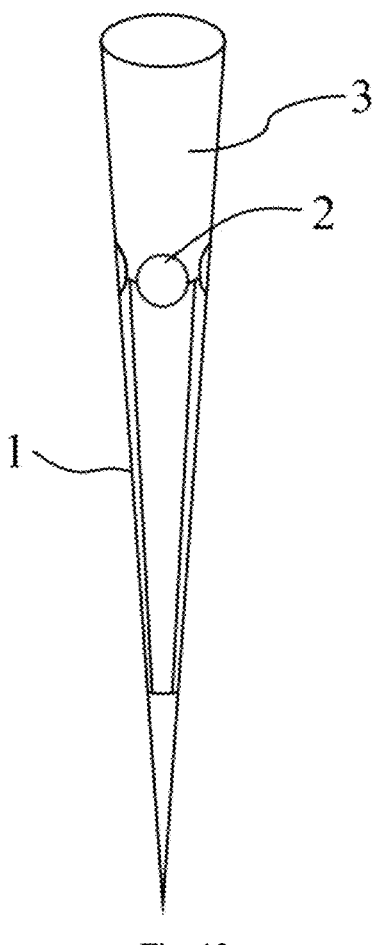
FIG. 12 is a structural diagram of the probe in Example 1 of the present disclosure.

As shown in FIG. 12, the upconversion luminescent paper-based microfluidic device further comprises a paper-based substrate 1 and a probe 3. The paper-based substrate 1 is configured for affixing a hydroxyl modification. The probe 3 is configured for binding the detection region of the upconversion luminescent biosensor 2. A material of the probe 3 is polymethylmethacrylate, and the probe 3 is in the form of a hollow cone with a diameter of 9 mm at a large end and a generatrix of 90 mm.

The hydroxyl-modified paper-based substrate 1 and the detection region 2 incorporating the upconversion luminescent biosensor are sequentially glued to an outer surface of the probe 3 to obtain an upconversion luminescent paper-based microfluidic device for in-situ sampling.

In FIGS. 3-6, FIG. 3 is a scanning electron microscope (SEM) image of the unmodified original paper-based substrate.

Figure 4:
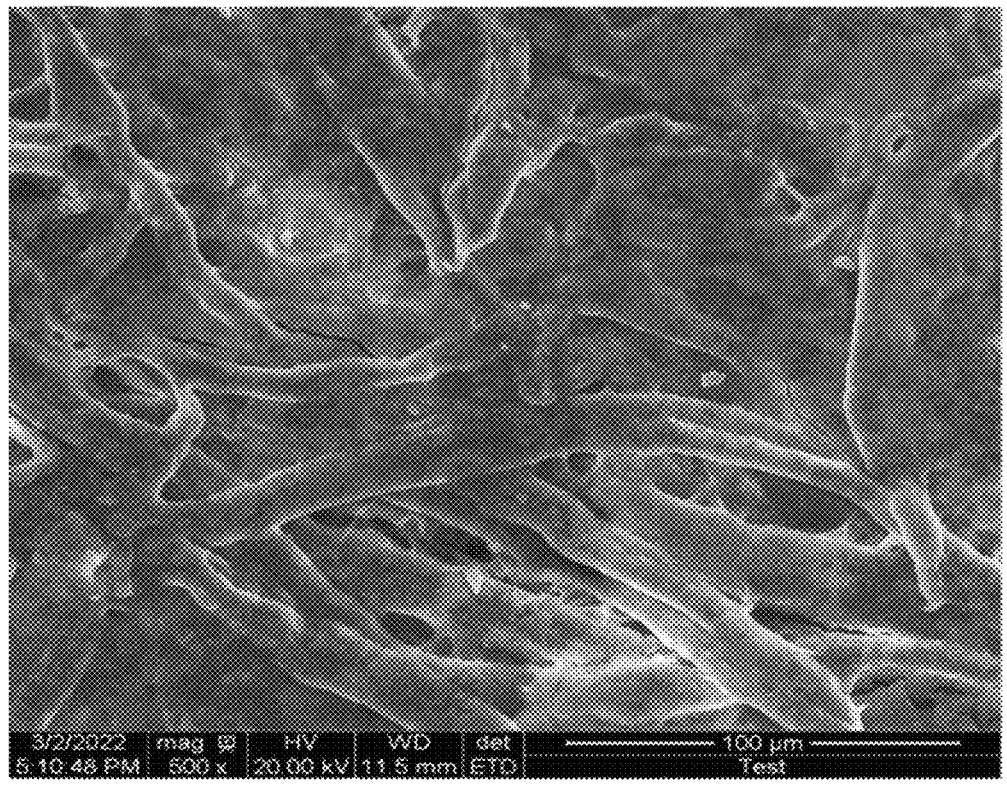
FIG. 4 is an SEM image of the paper-based substrate loaded with the upconversion luminescent biosensor.

FIG. 4 is an SEM image of the paper-based substrate loaded with the upconversion luminescent biosensor.

Figure 5:
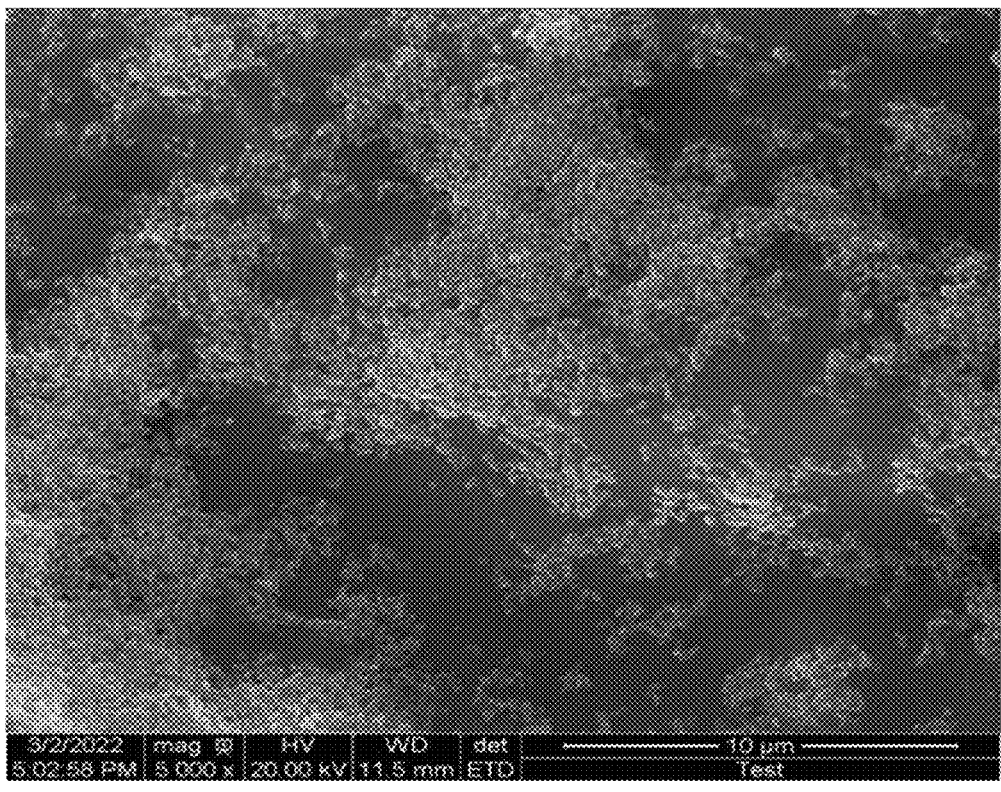
FIG. 5 is a partially enlarged SEM image of the paper-based substrate loaded with the upconversion luminescent biosensor.

FIG. 5 is a partially enlarged SEM image of the paper-based substrate loaded with the upconversion luminescent biosensor.

Figure 6A:
FIGS. 6A-C are energy dispersive spectroscopy (EDS) maps of yttrium, ytterbium, and thulium, respectively.
Figure 6B:
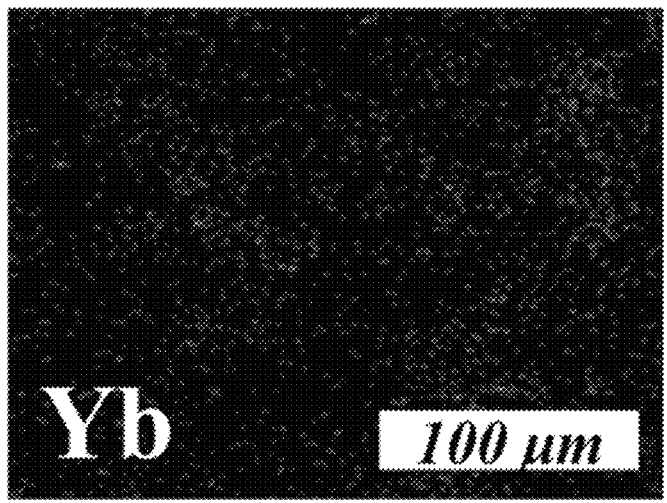
Figure 6C:
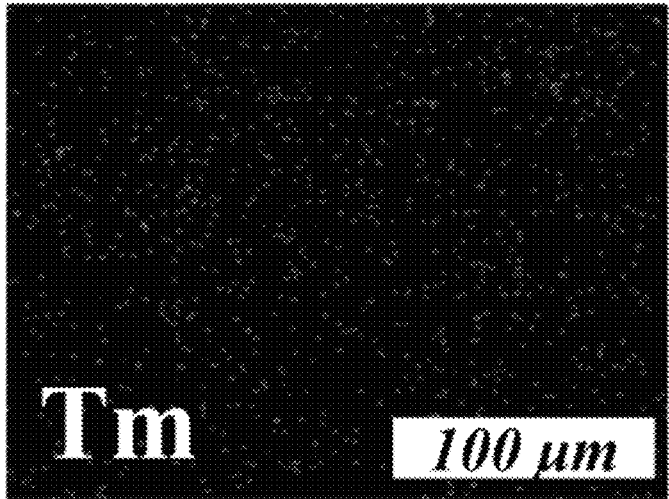

FIGS. 6A-C are energy dispersive spectroscopy (EDS) maps of yttrium, ytterbium, and thulium, respectively;

The above SEM images demonstrated that the upconversion luminescent biosensor is uniformly loaded onto the detection region.

Figure 7:
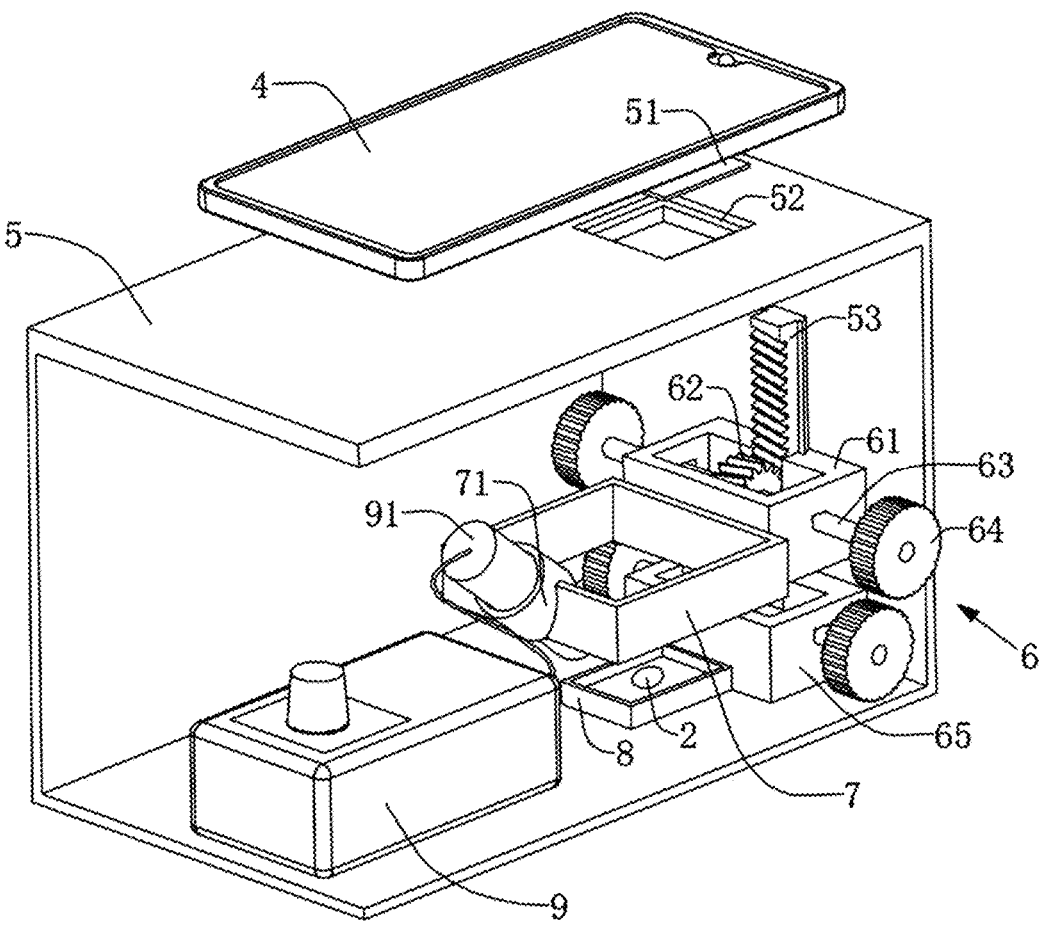
FIG. 7 is a structural diagram of the portable detection device of Example 1 of the present disclosure.

As shown in FIG. 7, a portable detection device based on smartphone imaging includes a box 5. The box 5 is arranged on an operating table.

An inside of the box is provided with a moving mechanism 6, a laser platform 7, a detection region support platform 8, and a near-infrared laser 9. The near-infrared laser is arranged opposite to the moving mechanism 6.

Figure 8:
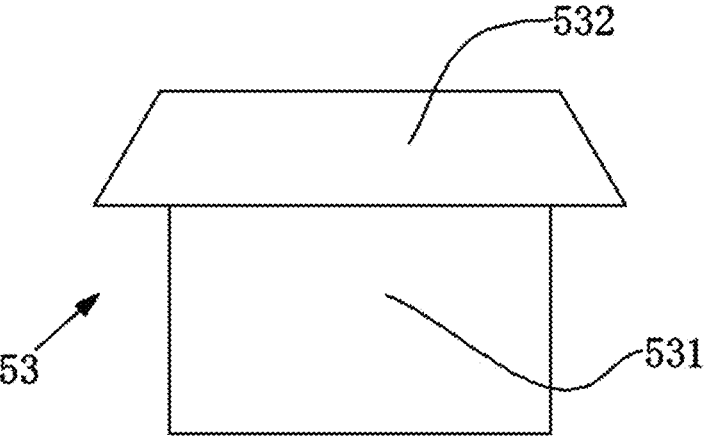
FIG. 8 is a cross-sectional view of the helical rack of Example 1 of the present disclosure.

As shown in FIGS. 7-8, a side wall of the box 5 is fixedly provided with a helical rack 53 perpendicular to a bottom surface of the box. The helical rack 53 comprises a helical tooth portion 531 and a clamping portion 532 integrally arranged with the helical tooth portion 531. The clamping portion 532 has a trapezoidal cross section. An upper base of the trapezoidal cross section faces towards the side wall of the box 5. A bottom base of the trapezoidal cross section faces towards the helical tooth portion 531. A length of the bottom base of the trapezoidal cross section is greater than a length of a segment where the helical tooth portion 531 coincides with the clamping portion 532.

As shown in FIG. 7, the moving mechanism 6 includes a first fixed frame 61, a helical gear 62, and a rotating shaft 63. The first fixed frame 61 is sleeved on the helical rack 53. The helical gear 62 is engaged with the helical rack 53. The rotating shaft 63 is fixedly provided with the helical gear 62 and passes through two side walls of the first fixed frame 61 and a center hole of the helical gear 62. Both ends of the rotating shaft 63 are each fixedly provided with a knob 64. The knob is configured to be rotated to realize upward and downward movement of the first fixed frame 61.

The laser platform 7 is fixedly provided on a side of the first fixed frame 61 towards the near-infrared laser 9. A sleeve 71 is integrally provided on a side of the laser platform 7 towards the near-infrared laser 9, and is configured for fixing a detector 91 of the near-infrared laser 9. The detector 91 is configured to emit a laser light to irradiate on the detection region 2 on the detection region support platform 8.

Meanwhile, as the detector 91 fitted at the sleeve 71 is heavy, under the gravity of the detector 91, there will be a large friction force between the contact surface of the first fixed frame 61 and the clamping portion 532 of the helical rack 53. Under the action of the friction force, the laser platform 7 can be kept stable in a stationary state.

The moving mechanism 6 also comprises a second fixed frame 65 with the same structure as the first fixed frame 61. The second fixed frame 65 is arranged below the first fixed frame 61. The second fixed frame 65 is configured to moved up and down along the helical rack 53.

The detection region support platform 8 is fixedly provided on a side of the second fixed frame towards the near-infrared laser, and is configured for placement of the detection region 2 loaded with the upconversion luminescent biosensor.

By adjusting the distance between the laser platform 7 and the detection area support platform 8 by means of the knob 64, the detector 91 of the near-infrared laser 9 can realize the focus adjustment in the vertical direction. Meanwhile, a top of the box 5 is provided with a through hole 52 above the detection region 2. A near-infrared filter 51 is provided at the through hole 52. The near-infrared filter 51 is configured to filter the laser light emitted by the near-infrared laser 9 and, simultaneously, to transmit the fluorescence emitted by the upconversion luminescent biosensor. The portable detection device comprises a smartphone 4, and a camera of the smartphone 4 is configured to perform imaging on the detection region 2 placed on the detection region support platform through the near-infrared filter 51.

The smartphone is equipped with a target concentration prediction software. The target concentration prediction software is configured to be executed to call a camera function of the smartphone 4 to acquire images of the detection region, and to realize functions of cutting an area of interest from a fluorescence image, extracting an image characteristic value of an image feature and calculating a target concentration.

The box 5 further includes a box door. The box door is fitted with iron sheets at the corners. The closure of the box 5 and the box door is realized by four magnets.

A detection method using the biosensing platform for in-situ sampling and target detection based on upconversion luminescence includes following steps.

A series of concentrations of 17β-E2 standard solutions ranging from 0-500 ng/ml is sampled using an upconversion luminescent paper-based microfluidic device. The sampling volume is stopped at the point where the sacrificial valve is just destroyed. The upconversion luminescent paper-based microfluidic device was subjected to chromatography in acetonitrile solvent for 20 min. After chromatography, 5 μL of phosphate buffer was added dropwise to the detection region for 20 min to complete the binding of 17β-E2 to the upconversion luminescent biosensor.

The fluorescence spectrum of the detection region was collected by fluorescence spectrometer, and the fluorescence standard curve of 17β-E2 content was established by linear fitting with the logarithm of the concentration of 17β-E2 standard solution and the characteristic value of the fluorescence signal, as shown below.

Figure 9A:
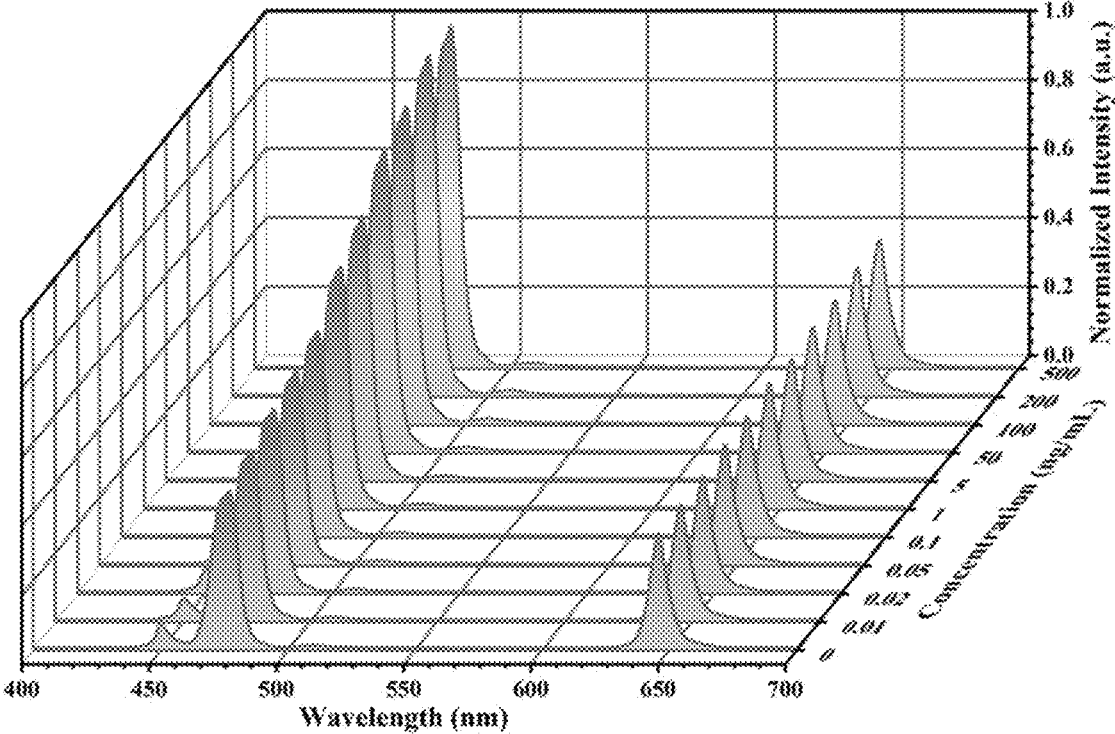
FIG. 9A shows fluorescence spectra of the detection region in the presence of different concentrations of 17β-E2.
Figure 9B:
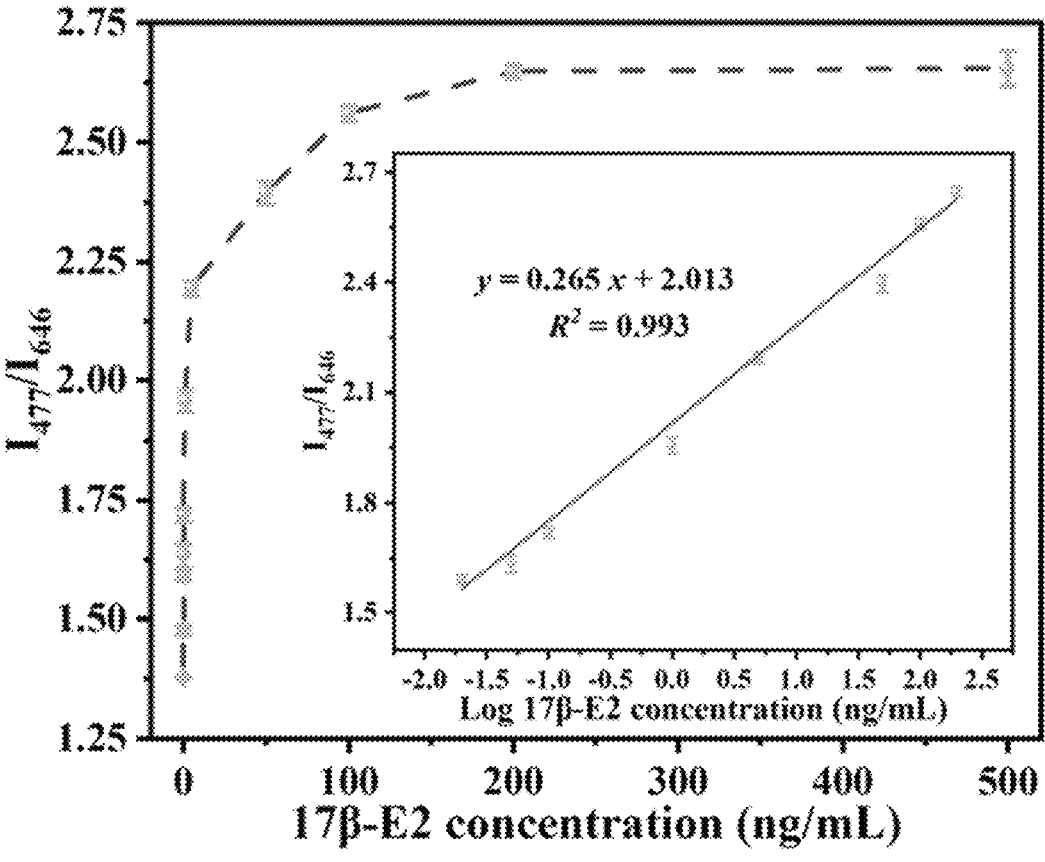
FIG. 9B shows a fitted standard curve of the 17β-E2 content versus the fluorescence signal characteristic value.

The ratio of a fluorescence intensity at 477 nm ($I_{477}$) to a fluorescence intensity at 646 nm ($I_{646}$) was used as the fluorescence signal characteristic value, as shown in FIG. 9A. After that, the value of the ratio $I_{477}$ to $I_{646}$ was linearly fitted to the logarithmic value of 17β-E2 content to obtain a fluorescence standard curve y=0.265x+2.013 with $R^2$=0.993 (FIG. 9B), which had a linear range of 0.02-200 ng/mL and a detection line of 0.012 ng/mL.

An image standard curve of 17β-E2 content was established by linearly fitting the logarithm of the concentration of 17β-E2 standard solution and image signal characteristic value obtained by a smartphone software of the by the portable detection device as follows.

Figure 10A:
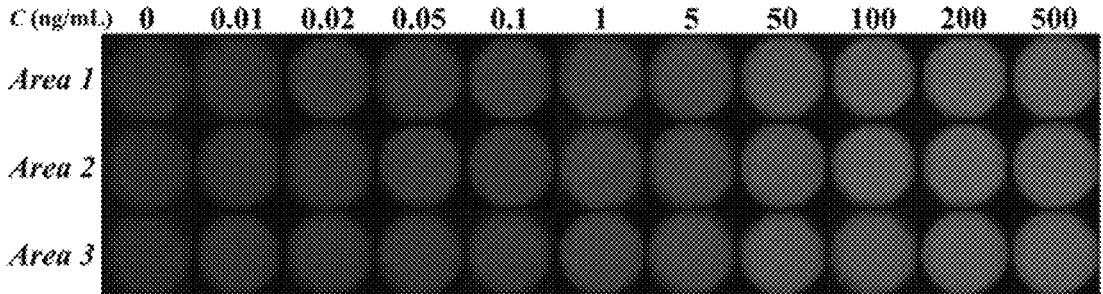
FIGS. 10A-D show results of detecting a target based on a smartphone imaging method in Example 1; where A shows phone imaging of the detection region of different concentrations of 17β-E2; B shows a relationship between image signal characteristic value of the detection region of different concentrations of 17β-E2 and 17β-E2 concentration; C shows a standard curve of the 17β-E2 content fitted to the image signal characteristic value; and D shows an interface of a developed cell phone software.
Figure 10B:
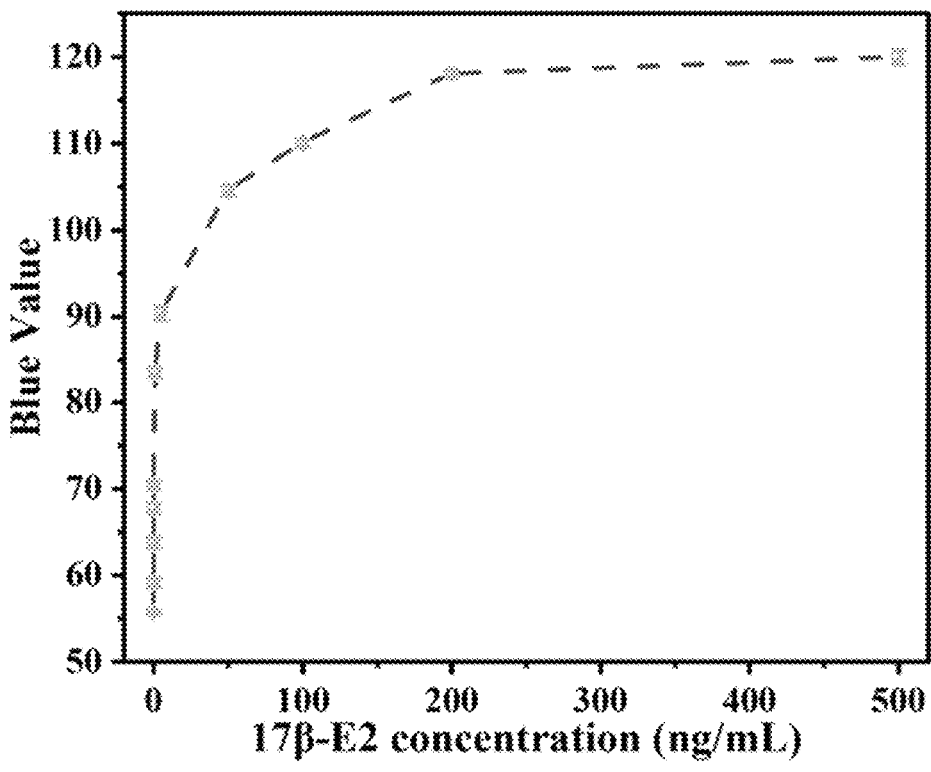
Figure 10C:
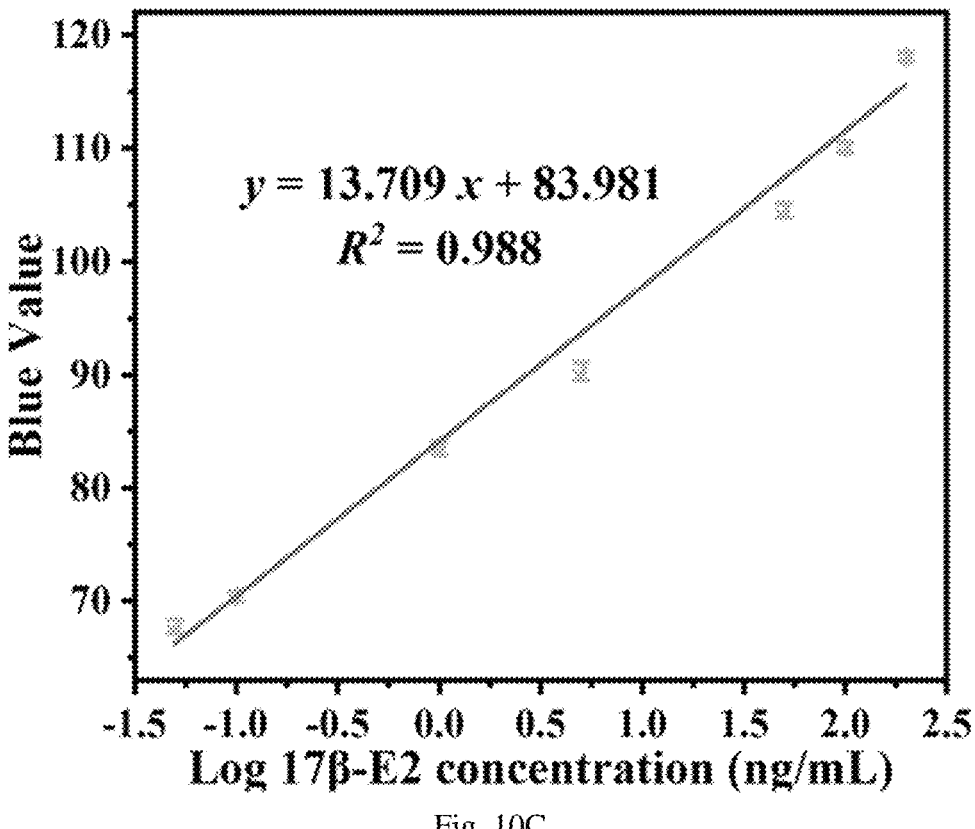
Figure 10D:
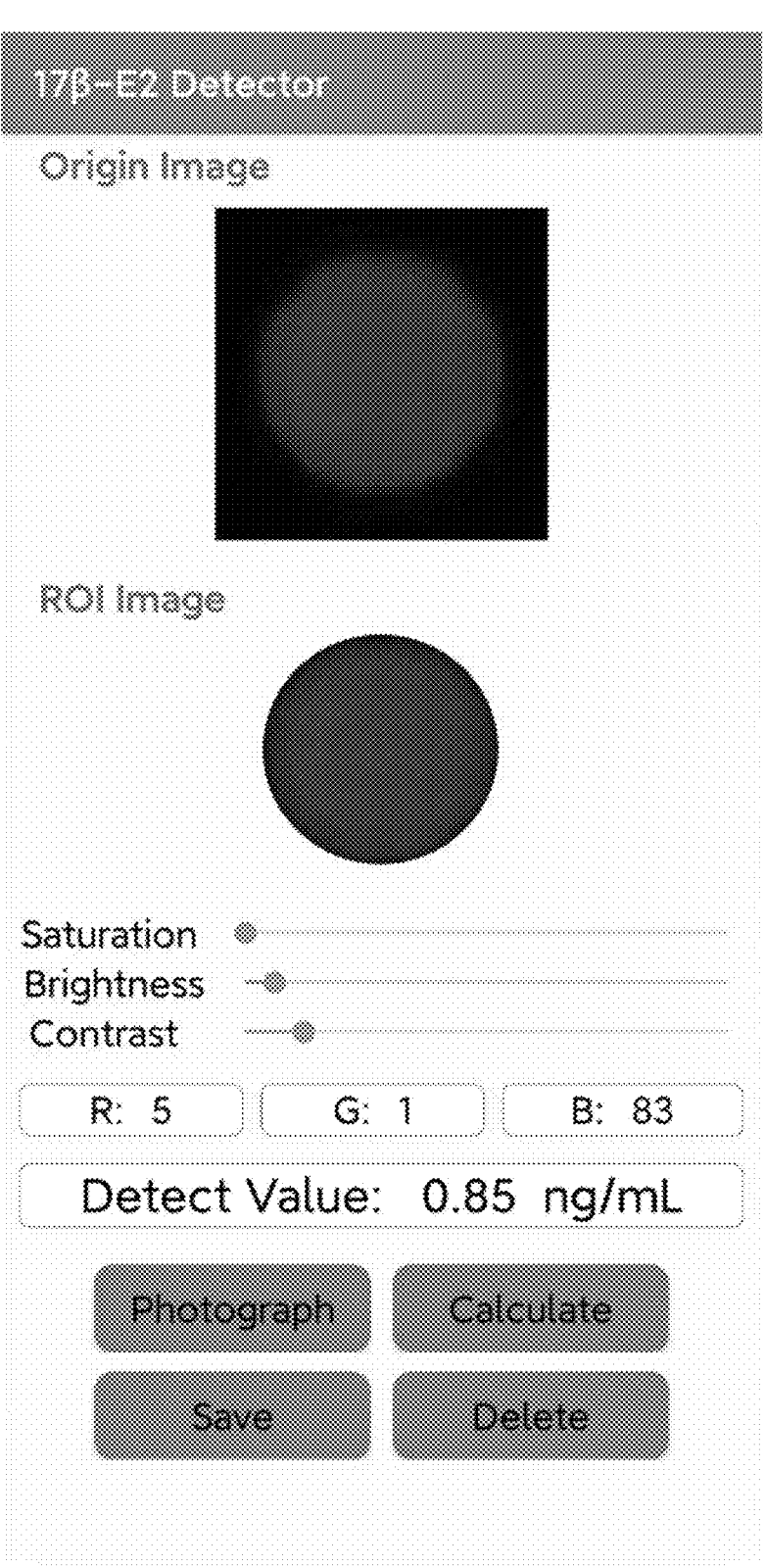

The detection region was placed on the detection area support platform of the portable detection device, and it was imaged using a smartphone, and the imaging results are shown in FIG. 10A. A region of 160×160 pixels was cropped as the region of interest with the luminescent region as the center. The blue value of the region of interest was used as the image signal feature value to obtain a plot of a set of blue values versus the concentration of 17β-E2 was obtained (FIG. 10B). The logarithmic values of this set of image signal characteristic values versus 17β-E2 content were linearly fitted to obtain a software image standard curve y=13.709x+83.981 with $R^2$=0.988 (FIG. 10C), which had a linear range of 0.05-200 ng/ml and a detection line of 0.042 ng/mL.

Figure 11A:
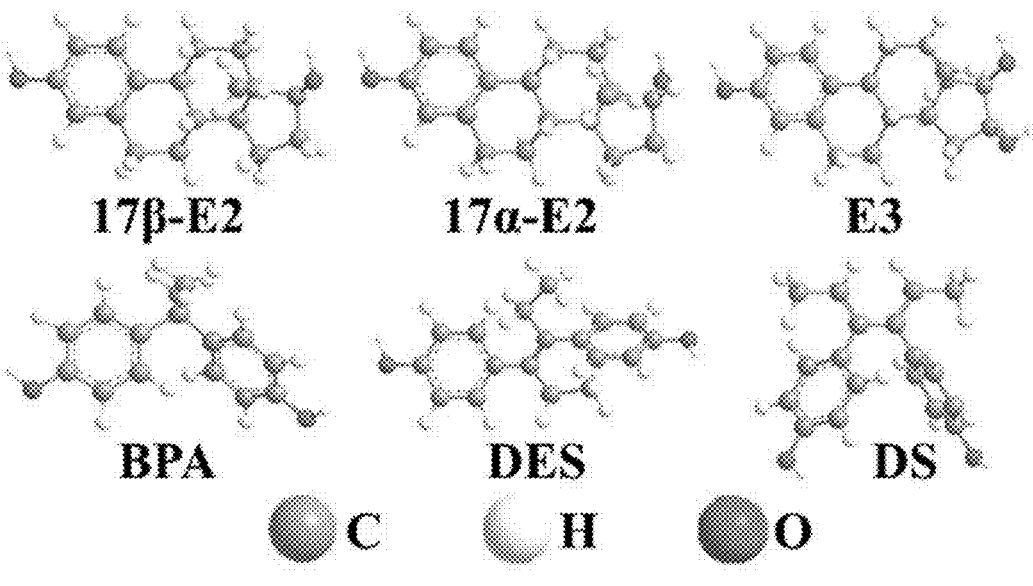
FIGS. 11A-B show performance evaluation result of the upconversion luminescent paper-based microfluidic device in Example 1; where A is a molecular structure model of the target and interference component; and B shows the selectivity and anti-interference test results.

Performance Tests:

17α-estradiol (17α-E2), estriol (E3), bisphenol A (BPA), hexestrol (DES), and dienestrol (DS) were used as interfering substances (FIG. 11A) for detection of the upconversion luminescent paper-based microfluidic device to assess the selectivity of the biosensing platform.

Figure 11B:
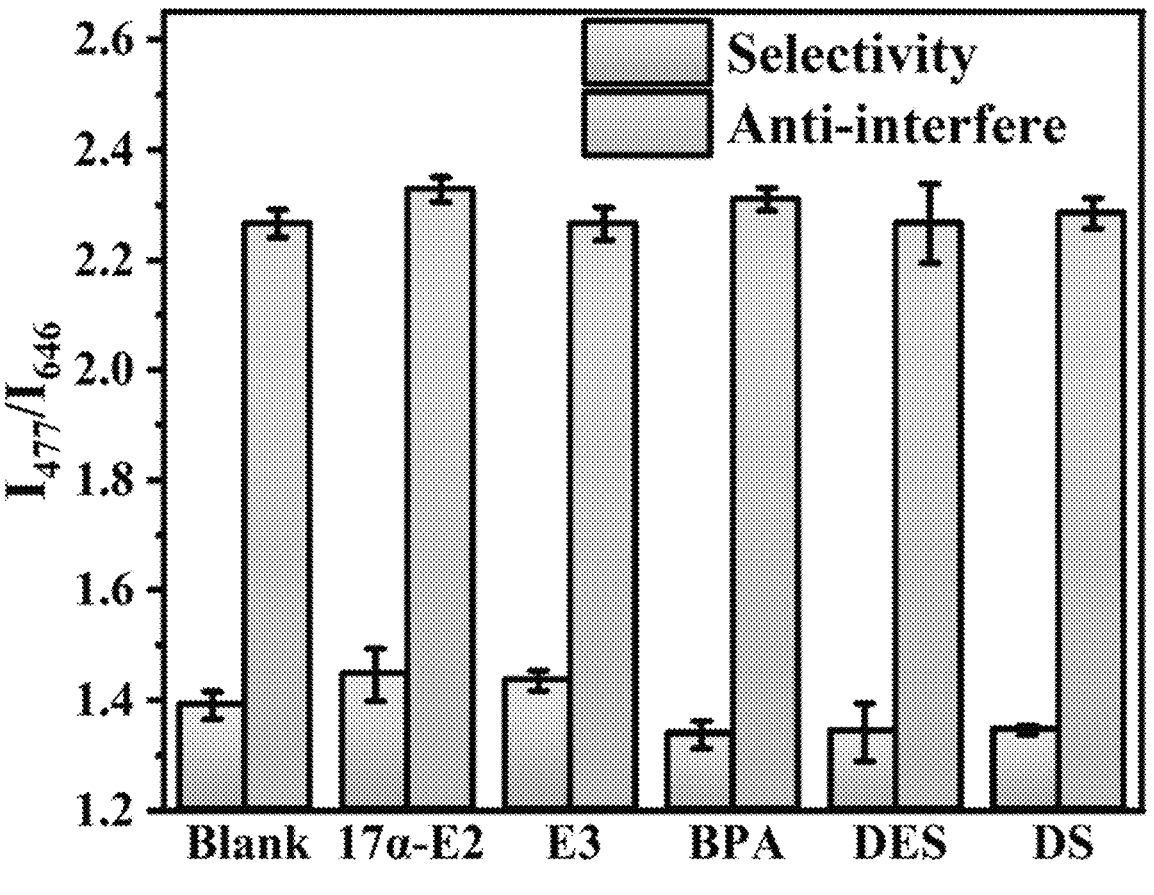

Specifically, the interfering substances were mixed with 17β-E2 in a concentration ratio of 100:1 for upconversion luminescent paper-based microfluidic device detection to assess the anti-interference of the biosensing platform. As shown in FIG. 11B, only the target 17β-E2 could cause a significant change in the signal, and the high concentration of interfering substances did not cause a significant change in the 17β-E2 detection signal. This demonstrates that the biosensing platform based on upconversion luminescence for in-situ sampling and target detection has a good selectivity and an anti-interference.

Application Example 1

In this embodiment, the sample to be tested is blood.

A whole blood sample obtained from an adult female was taken, and the supernatant plasma was retained for sampling and detection after centrifugation at 4000 rpm for 20 min.

After the sample was taken with the upconversion luminescent paper-based microfluidic device, the fluorescent signal characteristic value ($I_{477}/I_{646}$=1.717) determined was substituted into the fluorescent standard curve to calculate the 17β-E2 content in the plasma sample as 0.076 ng/mL.

The image signal characteristic value (Blue value=68.293) obtained by the smartphone imaging-based portable detection device was substituted into the image standard curve to calculate the 17β-E2 content in the plasma sample as 0.072 ng/mL.

Application Example 2

In this embodiment, the sample to be tested is water from the Yangtze River.

The Yangtze river water is taken, filtered through a 0.45 μM filter membrane, sampled using the upconversion luminescent paper-based microfluidic device, and determined to obtain the fluorescence signal characteristic value ($I_{477}/I_{646}$=1.771). The fluorescence signal characteristic value ($I_{477}/I_{646}$=1.771) was substituted into the fluorescence standard curve to calculated the content of 17β-E2 in the Yangtze River Water sample as 0.114 ng/mL. The image signal characteristic value (Blue value=71.278) obtained by the smartphone imaging-based portable detection device was substituted into the image standard curve to calculate the 17β-E2 content in the Yangtze River water sample as 0.119 ng/mL.

Application Example 3

In this embodiment, the sample to be tested are fish and shrimp.

The fish and shrimp were sampled using an upconversion luminescent paper-based microfluidic device after the surfaces were wiped clean using absorbent paper and oil-absorbent paper, respectively.

The fluorescence signal characteristic value ($I_{477}/I_{646}=1.666$) obtained by determination of the fish sample was substituted into the fluorescence standard curve to calculate the content of 17β-E2 in the fish sample as 0.049 ng/mL. The image signal characteristic value (Blue value=66.336) obtained by the using a smartphone imaging-based portable detection device was substituted into the image standard curve to Calculate the content of 17β-E2 in the fish sample as 0.052 ng/ml.

The fluorescence signal characteristic value ($I_{477}/I_{646}=1.667$) obtained by determination of shrimp meat was substituted into the fluorescence standard curve to calculate the content of 17β-E2 in the shrimp sample as 0.050 ng/mL. The image signal characteristic value (Blue value=66.607)

obtained by the smartphone imaging-based portable detection device was substituted into the image standard curve to calculate the 17β-E2 content in the shrimp sample as 0.054 ng/mL.

The technical features of the embodiments described above can be arbitrarily combined as long as there is no contradiction, and such combinations should be considered as falling within the scope of the disclosure. For the sake of brevity, not all possible combinations of the technical features have been described.

The above-described embodiments are merely illustrative some of the present disclosure, and should not be understood as limiting the scope of this application. It should be noted that for those skilled in the art, various variations and modifications made based on the content disclosed herein without departing from the spirit of the disclosure shall fall within the scope of the present disclosure defined by the appended claims.

---

---

What is claimed is:

1. A biosensing platform for in-situ sampling and target detection based on upconversion luminescence, comprising:

an upconversion luminescent paper-based microfluidic device;

an upconversion luminescent biosensor; and a portable detection device based on smartphone imaging;

wherein the upconversion luminescent paper-based microfluidic device is configured for in-situ sampling of a to-be-detected substance; the upconversion luminescent biosensor is configured to allow a target to specifically recognize the to-be-detected substance; and the portable detection device is configured to detect a content of the to-be-detected substance;

the upconversion luminescent paper-based microfluidic device comprises:

a probe;

a paper-based substrate; and detection regions;

wherein the probe has a cone shape; the paper-based substrate is affixed to an outer surface of the probe, and is located on an end close to a vertex of the probe; the paper-based substrate is configured for sampling and chromatography of a sample containing the to-be-detected substance; each of the detection regions is affixed to the outer surface of the probe, and is located on an end away from the vertex of the probe; each of the detection regions is configured for combining the to-be-detected substance with the upconversion luminescent biosensor; and the paper-based substrate is connected to the detection regions;

the upconversion luminescent paper-based microfluidic device is prepared through the following steps:

modifying the paper-based substrate with hydroxyl to obtain hydroxyl modified paper-based substrate, and cutting the hydroxyl modified paper-based substrate in a fan shape;

starting from a center of a circle of the fan shape, drawing a sacrificial valve with a dye at ⅓ of a radius of the fan shape, wherein an area between the sacrificial valve and the center of the circle is a sampling area, and an area between the sacrificial valve and an arc of the fan shape is a chromatography area;

constructing three independent chromatographic channels by drawing a paraffin barrier using liquid paraffin at three equal positions in the chromatography area; and obtaining three independent detection regions by punching holes at ends of the three chromatographic channels using a hole punch, wherein the detection regions are amino modified;

the upconversion luminescent biosensor is prepared through steps of:

(S1) preparing an upconversion nanoparticle seed through steps of:

mixing a methanol solution containing yttrium chloride hexahydrate, oleic acid and 1-octadecene followed by reaction at 160-170° C. for 25-35 min and cooling to obtain a first reaction mixture; wherein an amount of the yttrium chloride hexahydrate is 1-1.2 mmol;

adding a methanol solution containing sodium oleate and ammonium fluoride to the first reaction mixture followed by reaction at 120-130° C. for 25-35 min and at 290-300° C. for 25-35 min to obtain a second reaction mixture; and adding ethanol to the second reaction mixture to obtain a solid precipitate followed by centrifugal washing to obtain the upconversion nanoparticle seed;

(S2) preparing core-shell upconversion nanoparticles through steps of:

mixing a methanol solution containing ytterbium chloride hexahydrate and thulium chloride hexahydrate, oleic acid, 1-octadecene followed by reaction at 160° C. for 25-35 min and cooling to obtain a third reaction mixture; wherein an amount of the ytterbium chloride hexahydrate is 0.35-0.4 mmol and an amount of the thulium chloride hexahydrate is 0.01-0.03 mmol;

adding a cyclohexane solution containing the upconversion nanoparticle seed obtained in step (S1) and a methanol solution containing sodium hydroxide and ammonium fluoride to the third reaction mixture followed by reaction at 120-130° C. for 25-35 min and at 290-300° C. for 60-70 min to obtain a fourth reaction mixture; and adding ethanol to the fourth reaction mixture to obtain a solid precipitate followed by centrifugal washing to obtain the core-shell upconversion nanoparticles;

(S3) preparing core-shell-shell upconversion nanoparticles (UCNPs) through steps of:

mixing a methanol solution containing yttrium chloride hexahydrate, oleic acid, 1-octadecene followed by reaction at 160° C. for 25-35 min and cooling to obtain a fifth reaction mixture; wherein an amount of the yttrium chloride hexahydrate is 0.2-0.5 mmol;

adding a cyclohexane solution containing the core-shell upconversion nanoparticles obtained in step (S2) and a methanol solution containing sodium hydroxide and ammonium fluoride to the fifth reaction mixture followed by reaction at 120-130° C. for 25-35 min and at 290-300° C. for 60-70 min to obtain a sixth reaction mixture;

and adding ethanol to the sixth reaction mixture to obtain a solid precipitate followed by centrifugal washing and drying to obtain the core-shell-shell UCNPs;

(S4) carrying out hydrophilic modification on the core-shell-shell UCNPs obtained in step (S3);

(S5) modifying hydrophilically-modified UCNPs with DNA; and (S6) modifying DNA-modified UCNPs obtained from step (S5) with a dye; wherein the dye is synergetic binding reagent (SYBR) Green I dye, and the to-be-detected substance is 17β-estradiol (17β-E2).

2. The biosensing platform of claim 1, wherein the step (S4) comprises:

dispersing the core-shell-shell UCNPs obtained in step (S3) in a hydrochloric acid solution followed by ultrasonic treatment for 30-40 min, centrifugation, washing and transferring to a mixture of chloroform and toluene to obtain a seventh reaction mixture;

adding an aqueous solution containing polyacrylic acid to the seventh reaction mixture to obtain a eighth reaction mixture; and sealing the eighth reaction mixture followed by reaction under vigorous stirring for 24-48 h, centrifugation and washing to obtain carboxyl-grafted UCNPs.

3. The biosensing platform of claim 1, wherein the step (S5) comprises:

dispersing the carboxyl-grafted UCNPs obtained in step (S4) in a 4-morpholineethanesulfonic acid buffer containing carbamide and N-hydroxysulfosuccinimide followed by incubation for 2-3 h and centrifugation to obtain activated carboxyl-grafted UCNPs; and grafting a strand complementary to an aptamer strand and the aptamer strand sequentially onto the activated carboxyl-grafted UCNPs to obtain the DNA-modified UCNPs.

4. The biosensing platform of claim 1, wherein the portable detection device comprises a box;

an inside of the box is provided with a moving mechanism, a laser platform, a detection region support platform and a near-infrared laser; wherein the near-infrared laser is arranged opposite to the moving mechanism;

a side wall of the box is fixedly provided with a helical rack perpendicular to a bottom surface of the box; the helical rack comprises a helical tooth portion and a clamping portion integrally arranged with the helical tooth portion; the clamping portion has a trapezoidal cross section; an upper base of the trapezoidal cross section faces towards the side wall of the box; a bottom base of the trapezoidal cross section faces towards the helical tooth portion; a length of the bottom base of the trapezoidal cross section is greater than a length of a segment where the helical tooth portion coincides with the clamping portion;

the moving mechanism comprises a first fixed frame, a helical gear and a rotating shaft; the first fixed frame is sleeved on the helical rack; the helical gear is engaged with the helical rack; the rotating shaft is fixedly provided with the helical gear, and passes through two side walls of the first fixed frame and a center hole of the helical gear; both ends of the rotating shaft are each fixedly provided with a knob; the knob is configured to be rotated to drive the first fixed frame to move upward and downward;

the laser platform is fixedly provided on a side of the first fixed frame towards the near-infrared laser; a sleeve is integrally provided on a side of the laser platform towards the near-infrared laser, and is configured to fixedly hold a detector of the near-infrared laser; the detector is configured to emit a laser light to irradiate the detection region on the detection region support platform by rotating the knob;

the moving mechanism also comprises a second fixed frame; the second fixed frame is arranged below the first fixed frame; the second fixed frame is configured to moved up and down along the helical rack; the detection region support platform is fixedly provided on a side of the second fixed frame towards the near-infrared laser, and is configured for placement of the detection region loaded with the upconversion luminescent biosensor;

a top of the box is provided with a through hole above the detection region; a near-infrared filter is provided at the through hole;

the portable detection device comprises a smartphone; the near-infrared filter is located between the camera and the detection region support platform; and a camera of the smartphone is configured to perform imaging on the detection region placed on the detection region support platform; and the smartphone is equipped with a target concentration prediction software; the target concentration prediction software is configured to, when executed, call a camera function of the smartphone to acquire images of the detection region, cut an area of interest from a fluorescence image, extract an image characteristic value and calculate a target concentration.

5. A method of operating a biosensing platform, the biosensing platform comprising:

an upconversion luminescent paper-based microfluidic device;

an upconversion luminescent biosensor; and a portable detection device based on smartphone imaging;

wherein the upconversion luminescent paper-based microfluidic device is configured for in-situ sampling of a to-be-detected substance; the upconversion luminescent biosensor is configured to allow a target to specifically recognize the to-be-detected substance; and the portable detection device is configured to detect a content of the to-be-detected substance;

the upconversion luminescent paper-based microfluidic device comprises:

a probe;

a paper-based substrate; and detection regions;

wherein the probe has a cone shape; the paper-based substrate is affixed to an outer surface of the probe, and is located on an end close to a vertex of the probe; the paper-based substrate is configured for sampling and chromatography of a sample containing the to-be-detected substance; each of the detection regions is affixed to the outer surface of the probe, and is located on an end away from the vertex of the probe; each of the detection regions is configured for combining the to-be-detected substance with the upconversion luminescent biosensor; and the paper-based substrate is connected to the detection regions;

the upconversion luminescent paper-based microfluidic device is prepared through the following steps:

modifying the paper-based substrate with hydroxyl to obtain hydroxyl modified paper-based substrate, and cutting the hydroxyl modified paper-based substrate in a fan shape;

starting from a center of a circle of the fan shape, drawing a sacrificial valve with a dye at ⅓ of a radius of the fan shape, wherein an area between the sacrificial valve and the center of the circle is a sampling area, and an area between the sacrificial valve and an arc of the fan shape is a chromatography area;

constructing three independent chromatographic channels by drawing a paraffin barrier using liquid paraffin at three equal positions in the chromatography area; and obtaining three independent detection regions by punching holes at ends of the three chromatographic channels using a hole punch, wherein the detection regions are amino modified;

the upconversion luminescent biosensor is prepared through steps of:

(S1) preparing an upconversion nanoparticle seed through steps of:

mixing a methanol solution containing yttrium chloride hexahydrate, oleic acid and 1-octadecene followed by reaction at 160-170° C. for 25-35 min and cooling to obtain a first reaction mixture; wherein an amount of the yttrium chloride hexahydrate is 1-1.2 mmol;

adding a methanol solution containing sodium oleate and ammonium fluoride to the first reaction mixture followed by reaction at 120-130° C. for 25-35 min and at 290-300° C. for 25-35 min to obtain a second reaction mixture; and adding ethanol to the second reaction mixture to obtain a solid precipitate followed by centrifugal washing to obtain the upconversion nanoparticle seed;

(S2) preparing core-shell upconversion nanoparticles through steps of:

mixing a methanol solution containing ytterbium chloride hexahydrate and thulium chloride hexahydrate, oleic acid, 1-octadecene followed by reaction at 160° C. for 25-35 min and cooling to obtain a third reaction mixture; wherein an amount of the ytterbium chloride hexahydrate is 0.35-0.4 mmol and an amount of the thulium chloride hexahydrate is 0.01-0.03 mmol;

adding a cyclohexane solution containing the upconversion nanoparticle seed obtained in step (S1) and a methanol solution containing sodium hydroxide and ammonium fluoride to the third reaction mixture followed by reaction at 120-130° C. for 25-35 min and at 290-300° C. for 60-70 min to obtain a fourth reaction mixture; and adding ethanol to the fourth reaction mixture to obtain a solid precipitate followed by centrifugal washing to obtain the core-shell upconversion nanoparticles;

(S3) preparing core-shell-shell upconversion nanoparticles (UCNPs) through steps of:

mixing a methanol solution containing yttrium chloride hexahydrate, oleic acid, 1-octadecene followed by reaction at 160° C. for 25-35 min and cooling to obtain a fifth reaction mixture; wherein an amount of the yttrium chloride hexahydrate is 0.2-0.5 mmol;

adding a cyclohexane solution containing the core-shell upconversion nanoparticles obtained in step (S2) and a methanol solution containing sodium hydroxide and ammonium fluoride to the fifth reaction mixture followed by reaction at 120-130° C. for 25-35 min and at 290-300° C. for 60-70 min to obtain a sixth reaction mixture;

and adding ethanol to the sixth reaction mixture to obtain a solid precipitate followed by centrifugal washing and drying to obtain the core-shell-shell UCNPs;

(S4) carrying out hydrophilic modification on the core-shell-shell UCNPs obtained in step (S3);

(S5) modifying hydrophilically-modified UCNPs with DNA; and (S6) modifying DNA-modified UCNPs obtained from step (S5) with a dye; wherein the dye is synergetic binding reagent (SYBR) Green I dye, and the to-be-detected substance is 17β-estradiol (17β-E2);

the method comprising:

preparing a plurality of 17β-E2 standard solutions varying in concentration, wherein concentrations of the plurality of 17β-E2 standard solutions are selected from 0-500 ng/ml;

sampling each of the plurality of 17β-E2 standard solutions with the upconversion luminescent paper-based microfluidic device to allow binding of 17β-E2 to the upconversion luminescent biosensor;

collecting, by a fluorescence spectrometer, a fluorescence spectrum of the detection region; and subjecting logarithmic values of the concentrations of the plurality of 17β-E2 standard solutions and fluorescence signal characteristic values to linear fitting to establish a fluorescence standard curve of 17β-E2; wherein the fluorescence signal characteristic values are calculated by a ratio of a fluorescence intensity at 477 nm ($I_{477}$) to a fluorescence intensity at 646 nm ($I_{646}$);

subjecting logarithmic values of the concentrations of the plurality of 17β-E2 standard solutions and image signal characteristic values obtained by a smartphone software to linear fitting to establish an image standard curve of 17β-E2;

performing, by the upconversion luminescent paper-based microfluidic device, in-situ sampling on a sample containing the to-be-detected substance to allow binding of the to-be-detected substance to the upconversion luminescent biosensor; and determining a fluorescence signal characteristic value and an image signal characteristic value, respectively; substituting the fluorescence signal characteristic value and the image signal characteristic value respectively into the fluorescence standard curve and the image standard curve to calculate a content of the to-be-detected substance in the sample.

* * * * *

SEQUENCE LISTING

```
Sequence total quantity: 2
SEQ ID NO: 1            moltype = DNA  length = 25
FEATURE                 Location/Qualifiers
source                  1..25
                        mol_type = other DNA
                        note = artificial sequence
                        organism = synthetic construct
SEQUENCE: 1
gcttccgcgc ttcagcgcgc agcaa                                         25

SEQ ID NO: 2            moltype = DNA  length = 76
FEATURE                 Location/Qualifiers
source                  1..76
                        mol_type = other DNA
                        note = artificial sequence
                        organism = synthetic construct
SEQUENCE: 2
gcttccagct tattgaatta cacgcagagg gtagcggctc tgcgcattca attgctgcgc  60
gctgaagcgc ggaagc                                                   76
```